(12) United States Patent
Akikaze et al.

(10) Patent No.: US 9,321,863 B2
(45) Date of Patent: Apr. 26, 2016

(54) POLYVINYL SULFONIC ACID, PRODUCTION METHOD THEREOF, AND USE THEREOF

(75) Inventors: Hiroshi Akikaze, Tokyo (JP); Hidenobu Higashi, Tokyo (JP); Hidenori Okuzaki, Kofu (JP)

(73) Assignees: Asahi Kasei Finechem Co., Ltd., Osaka (JP); University of Yamanashi, Yamanashi (JP)

( * ) Notice: Subject to any disclaimer, the term of this patent is extended or adjusted under 35 U.S.C. 154(b) by 143 days.

(21) Appl. No.: 14/113,604

(22) PCT Filed: Apr. 26, 2012

(86) PCT No.: PCT/JP2012/061264
§ 371 (c)(1),
(2), (4) Date: Dec. 18, 2013

(87) PCT Pub. No.: WO2012/147872
PCT Pub. Date: Nov. 1, 2012

(65) Prior Publication Data
US 2014/0091263 A1    Apr. 3, 2014

(30) Foreign Application Priority Data
Apr. 28, 2011    (JP) .................. 2011-101850

(51) Int. Cl.
| | |
|---|---|
| C08F 28/02 | (2006.01) |
| H01B 1/12 | (2006.01) |
| C08L 41/00 | (2006.01) |
| C08L 65/00 | (2006.01) |
| H01G 9/042 | (2006.01) |
| C09D 141/00 | (2006.01) |

(Continued)

(52) U.S. Cl.
CPC .............. *C08F 28/02* (2013.01); *C08L 41/00* (2013.01); *C08L 65/00* (2013.01); *C09D 141/00* (2013.01); *H01B 1/127* (2013.01); *H01G 9/0036* (2013.01); *H01G 9/028* (2013.01); *H01G 9/042* (2013.01); *C08G 2261/1424* (2013.01); *C08G 2261/3223* (2013.01); *C08G 2261/794* (2013.01)

(58) Field of Classification Search
None
See application file for complete search history.

(56) References Cited

U.S. PATENT DOCUMENTS

| | | |
|---|---|---|
| 4,910,645 A | 3/1990 | Jonas et al. |
| 5,300,575 A | 4/1994 | Jonas et al. |

(Continued)

FOREIGN PATENT DOCUMENTS

| | | |
|---|---|---|
| CN | 101977894 A | 2/2011 |
| JP | H02-0153516 A | 6/1990 |

(Continued)

OTHER PUBLICATIONS

Okayasu et al., Macromol. Chem. Phys. 2011, 212, 1072-1079.*

(Continued)

*Primary Examiner* — Karl J Puttlitz
(74) *Attorney, Agent, or Firm* — Morgan, Lewis & Bockius LLP

(57) ABSTRACT

The present invention relates to polyvinyl sulfonic acid comprising a vinyl sulfonic acid unit represented by a specific general formula (1), wherein the molar amount of sulfonic acid groups derived from vinyl sulfonic acid monomers with respect to the molar amount of total monomer units is 50.0 to 98.0 mol %, and the polyvinyl sulfonic acid has an absorbance of 0.1 or greater (aqueous solution: 0.2 mass %, cell length: 10 mm) in a wavelength range of 255 to 800 nm.

23 Claims, 2 Drawing Sheets

(51) Int. Cl.
*H01G 9/00* (2006.01)
*H01G 9/028* (2006.01)

(56) References Cited

U.S. PATENT DOCUMENTS

| | | |
|---|---|---|
| 2010/0033905 A1 | 2/2010 | Kobayakawa et al. |
| 2010/0033906 A1 | 2/2010 | Nobuta et al. |
| 2011/0017954 A1 | 1/2011 | Akikaze et al. |
| 2013/0149435 A1 | 6/2013 | Kirchmeyer et al. |

FOREIGN PATENT DOCUMENTS

| | | |
|---|---|---|
| JP | H05-214020 A | 8/1993 |
| JP | 2636968 B2 | 8/1997 |
| JP | 3040113 B2 | 5/2000 |
| JP | 3066431 B2 | 7/2000 |
| JP | 4077675 B2 | 4/2008 |
| JP | 2010-040770 A | 2/2010 |
| JP | 2010-040776 A | 2/2010 |
| JP | 2010-195980 A | 9/2010 |
| JP | 2010-248488 A | 11/2010 |

OTHER PUBLICATIONS

International Search Report issued in corresponding International Patent Application No. PCT/JP2012/061264 dated Jul. 31, 2012.
European Search Report issued in corresponding European Patent Application No. 12777193.9 dated Jun. 15, 2015.
Okayasu et al., Free Radical Polymerization Kinetics of Vinylsulfonic Acid and Highly Acidic Properties of its Polymer, Macromolecular Chemistry and Physics, vol. 212 (10), pp. 1072-1079 (2011).
Murugan et al., Cyclic voltammetry, electrochemical impedance and ex situ X-ray diffraction studies of electrochemical insertion and deinsertion of lithium ion into nanostructured organic-inorganic poly(3,4-ethylenedioxythiophene) based hybrids, Journal of Electroanalytical Chemistry, vol. 603 (2), pp. 287-296 (2007).

\* cited by examiner

POLYVINYL SULFONIC ACID, PRODUCTION METHOD THEREOF, AND USE THEREOF

TECHNICAL FIELD

The present invention relates to a polyvinyl sulfonic acid, a production method thereof, and use thereof.

BACKGROUND ART

As a dopant for conductive polymers, sulfonic acid has been used. That is, low-molecular-weight sulfonic acid and/or high-molecular-weight sulfonic acid have been used (see, for example, Patent Documents 1 and 2). It has been known that high-molecular-weight sulfonic acid maintains a stable interaction with a conductive polymer, in comparison with low-molecular-weight sulfonic acid (see, for example, Patent Document 3). It has been known that, in particular, polystyrene sulfonic acid (hereinafter also abbreviated as "PSS") exhibits high performance as a dopant (see, for example, Patent Documents 2 and 4). Moreover, polyvinyl sulfonic acid (hereinafter also abbreviated as "PVS") consisting of a polyethylene main chain that maintains a polymer structure and a sulfonic acid group acting as a dopant exhibits high performance as a dopant for conductive polymers (see, for example, Patent Document 5).

LIST OF PRIOR ART DOCUMENTS

Patent Document
Patent Document 1: Japanese Patent No. 3040113
Patent Document 2: Japanese Patent No. 2636968
Patent Document 3: Japanese Patent No. 3066431
Patent Document 4: Japanese Patent No. 4077675
Patent Document 5: Japanese Patent Laid-Open No. 2010-195980

SUMMARY OF INVENTION

Problems to be Solved by Invention

However, PSS described in Patent Documents 2 and 4 and the like comprises an aromatic ring, in addition to a sulfonic acid group acting as a dopant and a polyethylene main chain maintaining a polymer structure. Thus, such PSS is problematic in that the ratio of components other than conductive polymers in an electron transferring body becomes high, and in that conductivity per weight is reduced when it is processed into a conducting layer. Furthermore, PVS described in Patent Document 5 is problematic in that a conductive polymer-dopant composite obtained by polymerization of a conductive polymer in an aqueous solution and/or a suspension containing the polymer is precipitated immediately after generation of the composite, and thus in that a stable dispersion cannot be obtained.

As such, to date, there have been no high-molecular-weight sulfonic acid dopants, in which the ratio of a polyethylene main chain and sulfonic acid is high, which need no organic solvents for the improvement of conductivity, and with which a stable dispersion of a conductive polymer-dopant composite can be obtained. There have been a very few dopants that satisfy various performances required for the intended use of a conductive polymer.

It is a main object of the present invention: to provide a polyvinyl sulfonic acid, which is a high-molecular-weight sulfonic acid dopant capable of producing a stable dispersion of a conductive polymer-dopant composite and in which the ratio of a polyethylene main chain and sulfonic acid is high, and a production method thereof; and to provide the above-mentioned dispersion and a production method thereof, and in particular, a highly conductive dispersion that needs only a water solvent for the improvement of conductivity, and further, a conducting layer with a high electric conductivity prepared using the above-mentioned dispersion and an organic material comprising the conducting layer.

Means for Solving Problems

As a result of intensive studies, the present inventors have found that the above-mentioned object can be achieved by using a polyvinyl sulfonic acid having a special configuration as a high-molecular-weight dopant, thereby completing the present invention. Moreover, the inventors have also found that a conductive polymer is polymerized in the presence of an aqueous solution or a suspension containing the aforementioned dopant, so that a conducting layer having a high conductivity (for example, more than 10 S/cm) can be formed even in a state in which the obtained dispersion is stable and no organic solvents are added, thereby completing the present invention.

Specifically, the present invention relates to the below-mentioned polyvinyl sulfonic acid and a production method thereof, a conductive polymer dispersion and a production method thereof, a conducting layer formed with the aforementioned dispersion, and the like.

[1]
A polyvinyl sulfonic acid comprising a vinyl sulfonic acid unit represented by the following general formula (1):

wherein $R^1$, $R^2$ and $R^3$ each independently represent hydrogen, or an alkyl group or alkylene group, which has 1 to 15 carbon atoms; and Z represents hydrogen, halogen, an alkyl group or alkylene group, which has 1 to 15 carbon atoms, a metal ion, an ammonium ion, a protonated primary, secondary or tertiary amine, or a quaternary ammonium ion, wherein a molar amount of a sulfonic acid group derived from a vinyl sulfonic acid monomer with respect to a molar amount of total monomer units is 50.0 to 98.0 mol %, and the polyvinyl sulfonic acid has an absorbance of 0.1 or greater (aqueous solution: 0.2 mass %, cell length: 10 mm) in a wavelength range of 255 to 800 nm.

[2]
The polyvinyl sulfonic acid according to [1] above, which has a weight average molecular weight of 10,000 to 800,000.

[3]
The polyvinyl sulfonic acid according to [1] or [2] above, wherein a content of a component having a molecular weight of 5,000 or less is 10% or less.

[4]
The polyvinyl sulfonic acid according to any one of [1] to [3] above, which has an absorbance of 0.1 or greater (aqueous solution: 0.2 mass %, cell length: 10 mm) in a wavelength range of 475 to 575 nm.

[5]
A method for producing the polyvinyl sulfonic acid according to any one of [1] to [4] above, which comprises the steps of:

polymerizing a vinyl sulfonic acid monomer represented by the following general formula (1)':

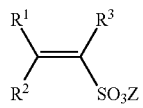 (1)' wherein $R^1$, $R^2$ and $R^3$ each independently represent hydrogen, or an alkyl group or alkylene group, which has 1 to 15 carbon atoms; and Z represents hydrogen, halogen, an alkyl group or alkylene group, which has 1 to 15 carbon atoms, a metal ion, an ammonium ion, a protonated primary, secondary or tertiary amine, or a quaternary ammonium ion
to obtain a polyvinyl sulfonic acid; and
heating the polyvinyl sulfonic acid at a temperature of higher than 60° C.

[6]
The method for producing the polyvinyl sulfonic acid according to [5] above, wherein, in the heating step, a heating temperature is 90° C. to 120° C. and a heating time is in a range of 0.5 to 500 hours.

[7]
The method for producing the polyvinyl sulfonic acid according to [5] or [6] above, wherein, in the heating step, the polyvinyl sulfonic acid is in a state of a mixture with a solvent.

[8]
A composite comprising the polyvinyl sulfonic acid according to any one of [1] to [4] above and a conductive polymer.

[9]
A dispersion formed by dispersing the composite according to [8] above in a solvent.

[10]
A method for producing the dispersion according to [9] above, which comprises the steps of: dissolving and/or dispersing the polyvinyl sulfonic acid according to any one of [1] to [4] above in a solvent; and polymerizing a conductive polymer monomer in the solvent in which the polyvinyl sulfonic acid has been dissolved and/or dispersed.

[11]
The method for producing the dispersion according to [10] above, which further comprises the steps of:
removing the polymerized product obtained in the polymerization step in the state of a solid, and then washing the solid; and
dissolving and/or dispersing the solid after the washing step in a solvent.

[12]
A conducting layer produced using the dispersion according to [9] above.

[13]
A condenser comprising the conducting layer according to [12] above.

[14]
A conductive film or a conductive sheet comprising the conducting layer according to [12] above.

[15]
A conducting layer comprising poly(3,4-ethylenedioxythiophene), wherein,
in a reflection method XDR measurement, a peak area ratio between a peak K in which 2θ is 8° to 10° and a peak L in which 2θ is 24° to 28° (peak K area/peak L area) is 1.0 to 10.0.

[16]
A dispersion that forms a conducting layer, wherein
the conducting layer comprises poly(3,4-ethylenedioxythiophene), and
in a reflection method XDR measurement of the conducting layer, a peak area ratio between a peak K in which 2θ is 8° to 10° and a peak L in which 2θ is 24° to 28° (peak K area/peak L area) is 1.0 to 10.0.

[17]
The dispersion according to [16] above, which comprises a conductive polymer and a polyanion.

[18]
The dispersion according to [17] above, wherein the conductive polymer is poly(3,4-ethylenedioxythiophene).

[19]
The dispersion according to [17] above, wherein the polyanion is the polyvinyl sulfonic acid according to any one of [1] to [4] above.

[20]
A conducting layer formed from the dispersion according to any one of [16] to [19] above.

[21]
A method for producing the dispersion according to any one of [16] to [19] above, which comprises the steps of: dissolving and/or dispersing a polyanion in a solvent; and polymerizing a conductive polymer monomer in the solvent in which the polyanion has been dissolved and/or dispersed.

[22]
The method for producing the dispersion according to [21] above, which further comprises the steps of:
removing the polymerized product obtained in the polymerization step in a state of a solid, and then washing the solid; and
dissolving and/or dispersing the solid after the washing step in a solvent.

[23]
A condenser comprising the conducting layer according to [15] or [20] above.

[24]
A conductive film or a conductive sheet comprising the conducting layer according to [15] or [20] above.

Advantages of Invention

A conductive composite, in which the polyvinyl sulfonic acid of the present invention is used as a dopant for conductive polymers, is highly stable in a dispersion, and from such a conductive composite, a conducting layer exhibiting high conductive performance can be produced, even if a high-boiling-point organic solvent is not added. Because of the high stability of the dispersion, a reduction in conductive performance due to addition of an agent for improving the physical properties of a layer becomes small and it becomes possible to improve the physical property of a conducting layer, which is used for various conductive products.

MODE FOR CARRYING OUT INVENTION

Figure 1:
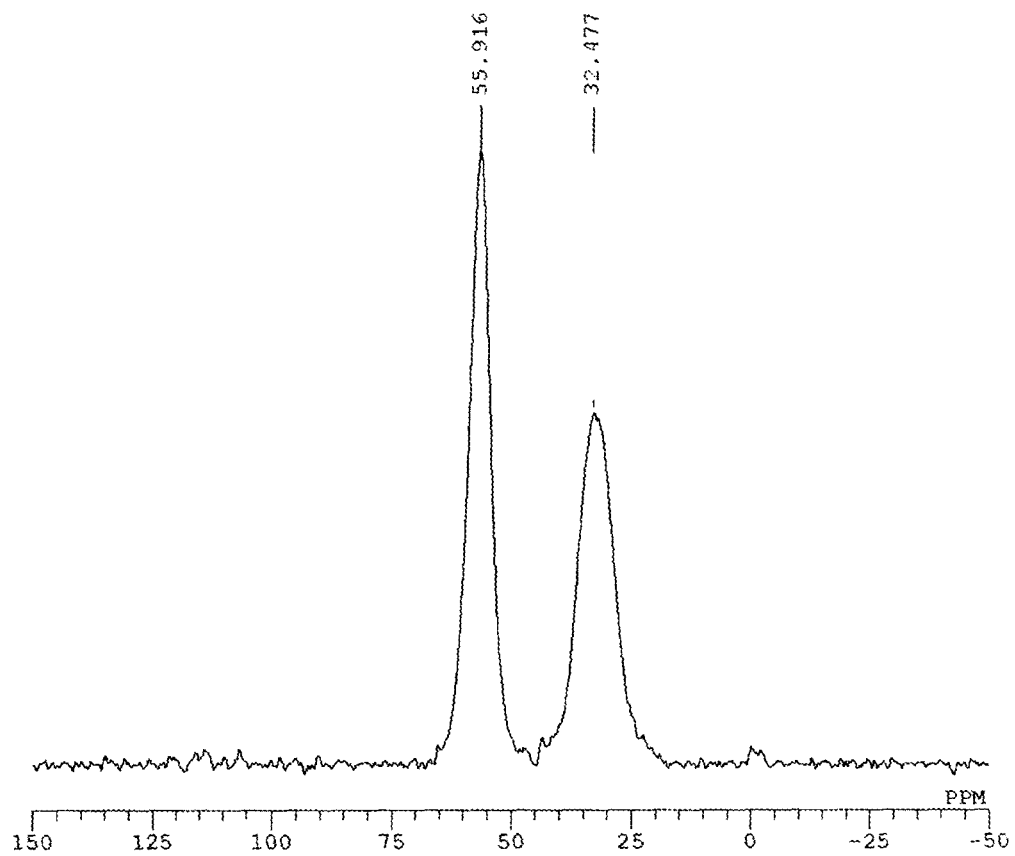
FIG. 1 is an example of the solid NMR measurement results of the polyvinyl sulfonic acids obtained in the Examples.

Hereinafter, the embodiment for carrying out the present invention (hereinafter referred to as "the present embodiment") will be described in detail. It is to be noted that the present invention is not limited to the following embodiment, and that various modifications may be made within the range of the gist thereof.

<<Polyvinyl Sulfonic Acid>>

The polyvinyl sulfonic acid of the present embodiment is a polyvinyl sulfonic acid comprising a vinyl sulfonic acid unit represented by the following general formula (1):

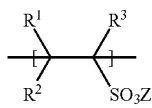

(1)

wherein $R^1$, $R^2$ and $R^3$ each independently represent hydrogen, or an alkyl group or alkylene group, which has 1 to 15 carbon atoms; and Z represents hydrogen, halogen, an alkyl group or alkylene group, which has 1 to 15 carbon atoms, a metal ion, an ammonium ion, a protonated primary, secondary or tertiary amine, or a quaternary ammonium ion, wherein the molar amount of sulfonic acid groups derived from vinyl sulfonic acid monomers with respect to the molar amount of total monomer units is 50.0 to 98.0 mol %, and the polyvinyl sulfonic acid has an absorbance of 0.1 or greater (aqueous solution: 0.2 mass %, cell length: 10 mm) in a wavelength range of 255 to 800 nm.

The alkyl group having 1 to 15 carbon atoms represented by $R^1$, $R^2$ and $R^3$ in the above formula is not particularly limited. Specific examples of such an alkyl group include a methyl group, an ethyl group, an n-propyl group, an isopropyl group, an n-butyl group, an isobutyl group, a sec-butyl group, a tert-butyl group, an n-pentyl group, an isopentyl group, a neopentyl group, and a tert-pentyl group.

In addition, the alkylene group having 1 to 15 carbon atoms represented by $R^1$, $R^2$ and $R^3$ in the above formula is not particularly limited. Specific examples of such an alkylene group include an ethylene group, an n-propylene group, an n-butylene group, an n-hexylene group, an n-heptylene group, an n-octylene group, and an n-dodecylene group.

1) Conductive Polymer

The polyvinyl sulfonic acid of the present embodiment is useful as a high-molecular-weight dopant used for conductive polymers. A conductive polymer, on which the polyvinyl sulfonic acid of the present embodiment acts as a dopant, means a polymer having a structure of a long chain in which double bonds and single bonds are alternatively disposed in a polymer structure thereof. The type of the conductive polymer is not particularly limited. Examples of such a conductive polymer include: polyaryls including, as typical examples, poly(p-phenylene), poly(o-phenylene), poly(m-phenylene), poly(2,6-naphthalene) and poly(9,10-anthracene); heteroaromatics including, as typical examples, polypyrrole, polythiophene, polyfuran, poriserefen, polypyridine, polypyridazine, poly(2,2'-bipyridine) and polypyrimidine; polyarylvinylenes including, as typical examples, poly(p-phenylenevinylene) and poly(1,4-naphthalenevinylene); polyanilines; and polyacetylenes. All types of functional groups may bind to the above described polymer. Moreover, the conductive polymer may also be a copolymer. From the viewpoint of polymerization in water in which the specific polyvinyl sulfonic acid of the present embodiment has been dissolved or dispersed, as such conductive polymers, heteroaromatics are preferable, and polypyrrole and polythiophene are more preferable. A particularly preferred polythiophene has a structural unit represented by the following formula (I):

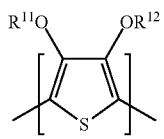

(I)

wherein $R^{11}$ and $R^{12}$ each independently represent hydrogen or an alkyl group having 1 to 5 carbon atoms, or they form together an alkylene group having 1 to 5 carbon atoms, and the alkylene group may be optionally substituted.

The above described alkyl group may be either a linear or branched alkyl group. Specific examples of such an alkyl group include a methyl group, an ethyl group, and a propyl group.

Examples of the above described alkylene group include a methylene group, an ethylene group, and a propylene group.

Moreover, the type of a substituent that may be possessed by the above described alkylene group is not particularly limited. Examples of such a substituent include a methyl group, an ethyl group, a hydroxymethyl group, and a hydroxyethyl group.

2) Vinyl Sulfonic Acid Monomer

The vinyl sulfonic acid monomer that forms the polyvinyl sulfonic acid of the present embodiment is a compound in which sulfonic acid directly binds to a vinyl group, which is represented by the following general formula (1)':

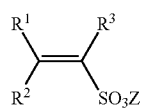

(1)' wherein $R^1$, $R^2$ and $R^3$ each independently represent hydrogen, or an alkyl group or alkylene group, which has 1 to 15 carbon atoms; and Z represents hydrogen, halogen, an alkyl group or alkylene group, which has 1 to 15 carbon atoms, a metal ion, an ammonium ion, a protonated primary, secondary or tertiary amine, or a quaternary ammonium ion. The type of such a vinyl sulfonic acid monomer is not particularly limited. Representative examples of the vinyl sulfonic acid monomer include: alkyl-substituted vinyl sulfonic acids such as 1-alkyl vinyl sulfonic acid, 2-alkyl vinyl sulfonic acid, and 1,2-alkyl sulfonic acid; sulfonates such as sodium vinyl sulfonate, sodium 1-alkyl vinyl sulfonate, potassium vinyl sulfonate, ammonium vinyl sulfonate, and vinyl sulfonic acid alkyl amine salts; sulfonic acid halides such as vinyl sulfonic acid fluoride and vinyl sulfonic acid chloride; and vinyl sulfonic acids. Among these compounds, preferred monomers include vinyl sulfonic acid and vinyl sulfonate, in which $R^1$, $R^2$ and $R^3$ each represent hydrogen, and Z represents hydrogen, sodium or potassium.

Since this vinyl sulfonic acid monomer does not have a phenyl group or the like between a high-molecular-weight main chain and a sulfonic acid group, the weight of the sulfonic acid group becomes extremely high with respect to the weight of the polymer. Thus, using this vinyl sulfonic acid monomer, there can be formed a doping agent in which the doping amount is extremely high with respect to the weight of a high-molecular-weight dopant.

3) Molar Amount of Total Monomer Units in Polymer

The term "molar amount of total monomer units in a polymer" is used in the present embodiment to mean the molar amount of polymer-constituting monomers, when the polymer-constituting monomers are defined as monomers having a multiple bond and when it is presumed that the polymer is constituted with monomers in which the molar amount of monomers used for polymerization to obtain the polymer becomes largest.

4) Polyvinyl Sulfonic Acid in which the Molar Amount of Sulfonic Acid Groups Derived from Vinyl Sulfonic Acid Monomers is in a Specific Range with Respect to the Molar Amount of Total Monomer Units In the polyvinyl sulfonic acid of the present embodiment, a sulfonic acid group derived from a vinyl sulfonic acid monomer in a polymer can be preferably used as a doping agent for a conductive polymer. This sulfonic acid group does not have a phenyl group or the like between a high-molecular-weight main chain and the sulfonic acid group. Hence, in the polyvinyl sulfonic acid of the present embodiment, the weight of the sulfonic acid group becomes extremely high with respect to the weight of the polymer, so that it can be an excellent doping agent having an extremely high doping amount with respect to the weight of the high-molecular-weight dopant. Conventionally, the sulfonic acid group has been problematic in that it easily moves as a result of the movement of the high-molecular-weight main chain, and in that the doping state to the conductive polymer becomes instable. On the other hand, in the present embodiment, the amount of a sulfonic acid group, at which the influence by the movement of the high-molecular-weight main chain can be reduced by the movement of the sulfonic acid group, has been discovered, and using the polyvinyl sulfonic acid, there can be produced a conductive polymer-dopant composite that is more stable than the above-mentioned polyvinyl sulfonic acid. That is to say, in the polyvinyl sulfonic acid of the present embodiment, the molar amount of sulfonic acid groups derived from vinyl sulfonic acid monomers is set in the range of 50.0 to 98.0 mol % with respect to the molar amount of total monomer units contained in a polymer. When the molar amount (mol %) of sulfonic acid groups derived from vinyl sulfonic acid monomers is the above described lower limit or more, the doping amount per weight of the polymer is preferably improved. When the molar amount (mol %) of sulfonic acid groups derived from vinyl sulfonic acid monomers is the above described upper limit or less, the sulfonic acid groups are hardly affected by the movement of the high-molecular-weight main chain, so that a stable conductive polymer-dopant composite can be formed. The molar amount of the sulfonic acid groups is preferably 85.0 to 97.0 mol %. This molar amount can be achieved by performing a heat treatment on polyvinyl sulfonic acid, or by mixing a crosslinker, as described later. It is to be noted that, in the present embodiment, the sulfonic acid group includes an anhydride obtained by dehydration and condensation of two molecules of sulfonic acid. Polyvinyl sulfonic acid, which includes an anhydride obtained by performing a heat treatment and then performing dehydration and condensation of two molecules of sulfonic acid groups as well as desulfonation, is a preferred polymer.

In the present embodiment, after production of polyvinyl sulfonic acid, when the produced polyvinyl sulfonic acid is subjected to a desulfonation treatment such as heating so as to adjust the molar amount of sulfonic acid groups derived from vinyl sulfonic acid monomers, as a method for measuring the molar amount of sulfonic acid groups derived from vinyl sulfonic acid monomers in the polyvinyl sulfonic acid, there is applied a method for measuring the molar amount of the aforementioned sulfonic acid groups, which comprises performing a desulfonation treatment on the polyvinyl sulfonic acid, and then titrating the removed solid with a base such as NaOH. Specifically, the removed solid is dissolved in ion exchange water, and the thus obtained solution is then subjected to potentiometric titration, employing Automatic Potentiometric Titrator AT-610 manufactured by Kyoto Electronics Manufacturing Co., Ltd. or the like, using, as a titrant, 0.1 mol/L sodium hydroxide manufactured by Sigma Aldrich, or the like, based on the following Expression (1):

$$\text{Molar amount (mol \%) of sulfonic acid groups} = \frac{\text{Molar concentration of titrant} \times \frac{V}{1000} \times f}{\frac{W}{108}} \times 100 \quad (1)$$

In the above Expression (1), the unit of molar concentration of the titrant is mol/L; V indicates the titer (mL) of the titrant; the number "108" indicates the molecular weight (g/mol) of vinyl sulfonic acid; W indicates the mass (g) of the removed solid; and f indicates the calibration coefficient of the titrant.

In the present embodiment, the ratio (mol %) of the molar amount of sulfonic acid groups derived from vinyl sulfonic acid monomers to the molar amount of total monomer units is 50.0 to 98.0 mol %

The molecular weight of the polyvinyl sulfonic acid of the present embodiment is not particularly limited. However, when the present polyvinyl sulfonic acid is used as a conductive product, there is a preferred range of the molecular weight, depending on the usage thereof. That is to say, when a conductive polymer-dopant composite is molded into a film and is then used, the weight average molecular weight of the polyvinyl sulfonic acid of the present embodiment is preferably set in the range of 2,000 to 1,000,000. In order to allow it to exhibit higher conductive performance, it is preferable to set the weight average molecular weight of the present polyvinyl sulfonic acid in the range of 10,000 to 800,000. An example of a method of obtaining polyvinyl sulfonic acid having the above described range of weight average molecular weight includes a method which comprises timely adjusting a monomer concentration, a polymerization temperature, and the concentration of a polymerization initiator, in polymerization methods such as radical polymerization, cationic polymerization, or anionic polymerization.

It is to be noted that weight average molecular weight can be obtained by gel permeation chromatographic (GPC) measurement in the present embodiment. Specifically, standard polyethylene oxide aqueous solutions each having a molecular weight of 900000, 250000, 107000, 50000, 21000, or 4100, manufactured by Tosoh Corporation, were prepared and used as standard solutions, and then, the weight average molecular weight can be measured using high-performance GPC system HLC-8320 manufactured by Tosoh Corporation, etc. As a column, an α guard column of TSK-GEL manufactured by Tosoh Corporation, such as α-2500, α-3000 or α-4000, can be used. These columns may also be connected with one another and may be used. With regard to this system, measurement conditions may be determined as appropriate. Preferred measurement conditions are a column temperature of 40° C., a flow rate of 1.0 ml/min, etc. The GPC measurement of each polymer can be carried out by injecting an analytical sample into the GPC system and performing detection using a refractive index detector connected with a chromatograph.

From the viewpoint of stability in doping, the content of low-molecular-weight components having a molecular weight of 5,000 or less in the polyvinyl sulfonic acid of the present embodiment is preferably 10% or less, more preferably 0.5% to 6.0%, and further preferably 0.5% to 6.0%. An example of a method of obtaining polyvinyl sulfonic acid, in which the content of low-molecular-weight components having a molecular weight of 5,000 or less is in the above described range, includes a method which comprises timely adjusting a monomer concentration, a polymerization temperature, a polymerization time, and the concentration of a polymerization initiator, in polymerization methods such as radical polymerization, cationic polymerization, or anionic polymerization.

In the present embodiment, the content of such low-molecular-weight components having a molecular weight of 5,000 or less can also be obtained by the above described GPC measurement.

The polyvinyl sulfonic acid of the present embodiment has an absorbance of 0.1 or greater (aqueous solution: 0.2 mass %, cell length: 10 mm) in a wavelength range of 255 to 800 nm. The absorbance is preferably 0.1 to 5.0, and more preferably 0.1 to 2.0.

In the present embodiment, the description "have an absorbance of 0.1 or greater (aqueous solution: 0.2 mass %, cell length: 10 mm) in a wavelength range of 255 to 800 nm" is used to mean that when polyvinyl sulfonic acid is processed into an aqueous solution containing 0.2 mass % polyvinyl sulfonic acid and the obtained solution is then subjected to UV measurement in a cell with an optical path length of 10 mm, an absorbance of 0.1 or greater can be obtained at any given wavelength in the range of 255 to 800 nm. In the UV measurement, absorbance may be measured at any given fixed wavelength (e.g. 255 nm), or it may also be measured while changing the measurement wavelength in the range of 255 to 800 nm.

In order to achieve an absorbance of 0.1 or greater in the wavelength range of 255 to 800 nm, it is preferable that the polyvinyl sulfonic acid have a multiple bond. As a result of a reduction in the movement of a high-molecular-weight main chain, such polyvinyl sulfonic acid can exhibit stable doping performance.

Moreover, the polyvinyl sulfonic acid of the present embodiment preferably has an absorbance of 0.1 or greater (aqueous solution: 0.2 mass %, cell length: 10 mm) in a wavelength range of 475 to 575 nm. It is assumed that such polyvinyl sulfonic acid having an absorbance of 0.1 or greater (aqueous solution: 0.2 mass %, cell length: 10 mm) in a wavelength range of 475 to 575 nm has more multiple bonds.

In the present embodiment, the description "have an absorbance of 0.1 or greater (aqueous solution: 0.2 mass %, cell length: 10 mm) in a wavelength range of 475 to 575 nm" is used to mean that when polyvinyl sulfonic acid is processed into an aqueous solution containing 0.2 mass % polyvinyl sulfonic acid and the obtained solution is then subjected to UV measurement in a cell with an optical path length of 10 mm, an absorbance of 0.1 or greater can be obtained at any given wavelength in the range of 475 to 575 nm.

Furthermore, in the viewpoint of stability in doping, it is preferable that the polyvinyl sulfonic acid of the present embodiment have a glass transition point of 100° C. or higher. Such polyvinyl sulfonic acid can be obtained, for example, by introducing a crosslinked structure into a molecular structure thereof. Preferred examples of a method of introducing a crosslinked structure into a molecular structure include: a method of adding a crosslinker to a vinyl sulfonic acid monomer during polymerization and reacting them; and a method of adding energy such as heat, light or electron beam to a linear polymer after polymerization of the linear polymer. The type of a substance used as a crosslinker is not particularly limited, as long as it is a monomer that may be polymerized and reacted with a vinyl sulfonic acid monomer. Specifically, a crosslinker having a multiple bond, as with a vinyl sulfonic acid monomer, is generally used, and representative examples of such a crosslinker include divinyl compounds such as divinyl sulfone, divinyl benzene, 1,4-divinyl cyclohexane and 1,3-butadiene.

When the polyvinyl sulfonic acid of the present embodiment has a crosslinked structure, its stability in doping tends to be further improved.

5) Method for Producing the Polyvinyl Sulfonic Acid of the Present Embodiment

The polyvinyl sulfonic acid of the present embodiment, in which the molar amount of sulfonic acid groups derived from vinyl sulfonic acid monomers is in the above described specific range, and which has the above described specific absorbance in a wavelength range of 255 to 800 nm, can be preferably produced by the following production method comprising a smaller number of steps.

The method for producing the polyvinyl sulfonic acid of the present embodiment comprises the steps of: polymerizing a vinyl sulfonic acid monomer represented by a general formula (1)' as shown below to obtain the polyvinyl sulfonic acid; and heating the obtained polyvinyl sulfonic acid at a temperature of higher than 60° C. Hereafter, the method for producing the polyvinyl sulfonic acid of the present embodiment will be described more in detail.

First, polyvinyl sulfonic acid can be produced by carrying out polymerization using, as a polymerizable monomer, a vinyl sulfonic acid monomer represented by the following general formula (1)':

wherein $R^1$, $R^2$ and $R^3$ each independently represent hydrogen, or an alkyl group or alkylene group, which has 1 to 15 carbon atoms; and Z represents hydrogen, halogen, an alkyl group or alkylene group, which has 1 to 15 carbon atoms, a metal ion, an ammonium ion, a protonated primary, secondary or tertiary amine, or a quaternary ammonium ion.

As a step of isolating a polymer after completion of the polymerization, if the polymerization has been carried out in the absence of a solvent, the polymer can be directly isolated. On the other hand, if the polymerization has been carried out in the presence of a solvent, the polymer can be isolated by utilizing a solvent distillation step or reprecipitation step and a drying step. Further, if an alkali metal salt is used as a monomer, the polymer can be isolated by a method comprising two steps, namely, a dealkalization step and a solvent distillation step.

The polyvinyl sulfonic acid polymerized using a vinyl sulfonic acid monomer as a polymerizable monomer is easily to undergo a desulfonation reaction with heat. Thus, in general, solvent distillation and/or drying are carried out at a temperature of 60° C. or lower.

The polyvinyl sulfonic acid of the present embodiment can be obtained by heating the above isolated polymer at a temperature of higher than 60° C.

The polyvinyl sulfonic acid is to undergo a desulfonation reaction and a dehydration reaction by heating at a temperature of higher than 60° C., so that the content of sulfonic acid groups, generation of a sulfonic acid anhydride, the UV absorbance, the glass transition point, the degree of crosslinking, and the like can be adjusted.

In the above described desulfonation and dehydration step involving heating, the heating temperature is preferably in the range of 80° C. to 180° C., and more preferably in the range of 90° C. to 120° C. If the heating temperature is the above described lower limit or more, the reaction rate in the desulfonation and dehydration reactions becomes high, and the heat treatment time thereby becomes short. If the heating temperature is the above described upper limit or less, simultaneous occurrence of many types of reactions can be suppressed, and since reaction products are dissolved in water, they hardly become gelatinous. Naturally, it is preferable that this heating step be carried out during a solvent distillation step or a drying step as a polymer isolation step. The heating treatment can be carried out using a drying machine, a kneader or other apparatuses used for powders, or by a known method such as the use of microwave. This heating treatment may also be carried out in a solvent. That is, it is preferable that the polyvinyl sulfonic acid be in the state of a mixture with a solvent in the above described desulfonation and dehydration step involving heating. Specific examples include: a method of heating the polyvinyl sulfonic acid that is dissolved in a high polar solvent including, as typical examples, water, methanol, ethanol, IPA, butanol, DMSO, DMF, and DMAc; and a method which comprises dispersing the polymer in a low polar solvent such as benzene, toluene, hexane or octane, and then heating the dispersion. In the case of a heat treatment performed in such a solvent, since gelation hardly takes place by heating at a high temperature, it is preferable to adopt a higher temperature than in the case of directly heating a solid. Specifically, the heating temperature is preferably in the range of 80° C. to 180° C., and more preferably in the range of 110° C. to 160° C. When a heat treatment is carried out in a state in which polyvinyl sulfonic acid is completely dissolved, the amount of a solvent used is preferably as small as possible because a heating temperature can be lowered and a heating time can be shortened. Specifically, the solvent is used in an amount of preferably 80 mass % or less, more preferably 50 mass % or less, further preferably 20 mass % or less, and particularly preferably 10 mass % or less, based on the total weight of the solution. When a heat treatment is carried out in a heterogenous system using a lipophilic solvent in which the polyvinyl sulfonic acid is not completely dissolved, the solvent may be used in an amount such that the solvent can coexist with a polyvinyl sulfonic acid polymer solid in a reaction pot and such that it can be heated. When the polyvinyl sulfonic acid is heated in a state in which it is mixed with a solvent, it is particularly preferable that desulfonation and dehydration reactions be promoted by removing from the reactor, sulfur oxide and water generated from the polyvinyl sulfonic acid together with the steam of the solvent, and thus eliminating them. That is, there is particularly preferably applied a method of using a solvent that can be subjected to azeotropy with water, so that the water generated as a result of the dehydration reaction can be easily removed from the reaction system. The time required for performing a heating treatment is different depending on each heating system. In the case of using a heating system capable of quickly transmitting heat to the entire solid, such as microwave, it is possible to perform a heat treatment for several seconds to several hours. The heating time required for a heating system of transmitting heat or the like from outside to inside the substance by utilizing common heat source is preferably in the range of 0.01 to 1,000 hours. The heating time is more preferably 0.5 to 500 hours, and further preferably 2 to 250 hours. This heating time may be short when a high heating temperature is applied. In contrast, when the heating temperature is low, the heating time is required to be prolonged.

In the method for producing the polyvinyl sulfonic acid of the present embodiment, it is preferable to form a sulfonic acid anhydride between sulfonic acid groups in the above described dehydration reaction involving heating. Such a sulfonic acid anhydride may be formed by an intramolecular or intermolecular dehydration reaction. If intermolecular dehydration takes place, the polyvinyl sulfonic acid takes a crosslinked structure, and as a result, solubility in water may be reduced. Thus, it is preferable to carry out intermolecular dehydration in a range in which the polyvinyl sulfonic acid can be dissolved in water. On the other hand, polyvinyl sulfonic acid having an intramolecular dehydration structure is preferable because it has an extremely small level of decrease in water solubility. When a lipophilic conductive polymer monomer is mixed and polymerized with water-soluble polyvinyl sulfonic acid to form a composite of the conductive polymer and the polyvinyl sulfonic acid, since such polyvinyl sulfonic acid having an intramolecular dehydration structure (sulfonic acid anhydride) has relatively high lipophilicity, it has a strong interaction with the conductive polymer and the conductive polymer monomer. As a result, the interaction of the polyvinyl sulfonic acid with the conductive polymer in the produced composite preferably becomes strong. Moreover, since such polyvinyl sulfonic acid having an intramolecular dehydration structure (sulfonic acid anhydride) is stable, it can preferably maintain its structure even during polymerization.

<<Composite>>

The composite of the present embodiment contains the above described polyvinyl sulfonic acid and a conductive polymer.

In the composite of the present embodiment, a sulfonic acid group in the above described polyvinyl sulfonic acid is considered to dope into the conductive polymer, so that they can interact with each other. This interaction is considered to be an electrostatic interaction between an anion of the polyvinyl sulfonic acid and a cation of the conductive polymer.

It is preferable that, in the composite of the present embodiment, the weight ratio of the polymer (polyvinyl sulfonic acid) used as a dopant to the weight of the conductive polymer be small, and that the weight ratio be 4 or less. When various additives and the like are added to the composite of the present embodiment to suppress a decrease in conductivity, the aforementioned weight ratio may be further decreased, and it may also be set at 1 or less.

The type of an additive used is not particularly limited. Examples of the additive used include those used to improve physical properties during film formation of the composite, such as celluloses, silicones, amines, polyurethanes, polyesters, polyamides, polyimides, polyolefins, polyethers, and poly(meth)acrylates. Some of these additives adhere to the outside of a composite particle, whereas other additives penetrate into a composite. When such an additive adheres to the outside of a composite particle, the additive itself becomes the resistance between particles, and electric conductivity is thereby reduced. When such an additive penetrates into a composite, it hardly has influence on the resistance of the additive itself between particles, so that reduction in electric conductivity can be suppressed. Examples of such an additive that can penetrate into a composite include silicones and amines, which have high compatibility with polyvinyl sulfonic acid forming the composite. These compounds are extremely useful as additives having less influence on conductive performance.

Furthermore, other known additives, which are used in a dispersion containing a conductive polymer, can also be used herein. For example, a pigment, a dye, an antifoaming agent, a crosslinker, a stabilizer, and a surfactant can be added.

<<Dispersion>>

The dispersion of the present embodiment is formed by dispersing the above described composite in a solvent.

A dispersion, in which the above described composite is dispersed in water and/or a polar solvent, is excellent in high dispersion stability and dispersibility in a solvent other than water. It is assumed that this is because the polyvinyl sulfonic acid of the present embodiment contains a large number of sulfonic acid groups that are necessary for dispersion of a highly lipophilic conductive polymer in a polar solvent. That is to say, in the case of PSS that is frequently used as a dopant for conductive polymers, it is highly probable that sulfonic acid groups are oriented to the same direction with respect to a molecular chain. Many sulfonic acid groups are used for interaction with a conductive polymer, and are not used for interaction with a solvent used for dispersive stabilization. On the other hand, in the case of the polyvinyl sulfonic acid of the present embodiment, it is assumed that the directions of sulfonic acid groups can be random with respect to a molecular chain, and that sulfonic acid around the sulfonic acid interacting with a conductive polymer faces to a direction opposite to the conductive polymer and interacts with a solvent, so that it helps dispersion.

Accordingly, in the case of the dispersion of the present embodiment, the concentration of the composite can be increased. The concentration of the composite can be 1 mass % or more based on the total weight of the dispersion. Taking into consideration the productivity of a process of applying a dispersion to produce a conducting layer, a dispersion, in which the concentration of the composite is 5 mass % or more, is preferably used. It is possible that even such a dispersion having a high concentration will be stably present.

Moreover, the type of a solvent is not particularly limited, but if taking into consideration a solvent evaporating rate in the process of applying a dispersion, examples of a solvent preferably used herein include: alcohols such as methanol, ethanol, isopropanol, and butanol; ethers such as dimethyl ether, methyl ethyl ether, diethyl ether, ethyl propyl ether, dipropyl ether, and ethyl butyl ether; ketones such as acetone, methyl ethyl ketone, and diethyl ketone; nitriles such as acetonitrile, propionitrile, and butyronitrile; and esters such as ethyl acetate and butyl acetate. In these organic solvents, the composite of the present embodiment can be stably dispersed.

In the present embodiment, when a solvent used to form a dispersion is water, the "dispersion" is also referred to as a "water dispersion."

The dispersion of the present embodiment is a dispersion used to form a conducting layer. It is preferable that the above described conducting layer contains poly(3,4-ethylenedioxythiophene), wherein, in a reflection method XDR measurement of the conducting layer, the peak area ratio between a peak K in which 2θ is 8° to 10° and a peak L in which 2θ is 24° to 28° (peak K area/peak L area) is 1.0 to 10.0. A conducting layer formed from such a dispersion preferably has high conductivity.

It is to be noted that the conducting layer and the reflection method XDR measurement will be described in detail in the after-mentioned section <<Conducting Layer>>.

Moreover, with regard to a measurement according to solid NMR, specific examples will be given in the after-mentioned Examples. The polyvinyl sulfonic acid of the present embodiment can be identified by the solid NMR.

Furthermore, the dispersion of the present embodiment preferably contains a conductive polymer and a polyanion. The type of such a conductive polymer is not particularly limited. For example, the above described conductive polymers can be used, and poly(3,4-ethylenedioxythiophene) is preferable. The type of such a polyanion is not particularly limited. For example, the above described polyvinyl sulfonic acid is preferable.

<<Method for Producing Dispersion>>

The method for producing the dispersion of the present embodiment is not particularly limited. In general, the production method comprises the steps of: dissolving and/or dispersing a polyanion (for example, the above described polyvinyl sulfonic acid) in a solvent; and polymerizing conductive polymer monomers in the solvent in which the polyvinyl sulfonic acid has been dissolved and/or dispersed.

In addition, it is preferable that the method for producing the dispersion of the present embodiment further comprises the steps of: removing the polymerized product obtained in the above polymerization step in the state of a solid, and then washing the solid; and dissolving and/or dispersing the solid after the above washing step in a solvent.

The conductive polymer monomer used herein may be monomer, from which a conductive polymer can be produced as a result of the polymerization reaction of the monomer. A particularly preferred conductive polymer, namely, a polythiophene-based conductive polymer, is produced, for example, by a single polymerization or copolymerization of 3,4-dioxythiophene represented by the following Formula (II):

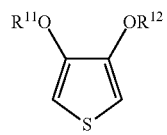

wherein $R^{11}$ and $R^{12}$ each independently represent hydrogen or an alkyl group having 1 to 5 carbon atoms, or form together an alkylene group having 1 to 5 carbon atoms, wherein the alkylene group may be optionally substituted.

The abundance of polyvinyl sulfonic acid during the polymerization reaction is preferably in the range of 0.5 to 50 moles, more preferably in the range of 0.8 to 10 moles, and further preferably in the range of 1 to 4 moles, based on 1 mole of polymerizable monomer.

The solvent used in the above described polymerization reaction is water and/or a polar solvent. The same solvents as those described in the dispersion of the present embodiment can be used.

During the above polymerization reaction, a suitable oxidizer may be used.

The type of an oxidizer is not particularly limited. Examples of the oxidizer include: persulfuric acid; persulfates including sodium persulfate, potassium persulfate and ammonium persulfate as typical examples; hydrogen peroxide; metal oxides including potassium permanganate as a typical example; and metal salts including ferric chloride and ferric nitrate as typical examples. However, examples of the oxidizer are not limited thereto. These oxidizers may be used either singly or in combination of two or more types. A preferred oxidizer is persulfate, and a more preferred oxidizer is ammonium persulfate, which is a persulfate containing no metals.

Moreover, in order to enhance dispersibility, it is preferable to stir the mixture during polymerization. The stirring method is not particularly limited. An efficient stirring method is preferable, and for example, stirring methods using a paddle impeller, a propeller impeller, an anchor impeller, a Pfaudler impeller, a turbine impeller, a max blend impeller, a full-zone impeller, etc. can be applied. Furthermore, in order to give high shear during polymerization, a high speed mixer, a homogenizer, or a kneader may also be used.

The polymerization temperature is not particularly limited. In general, it is preferably from −30° C. to 100° C. In order to suppress side reactions or decomposition reactions, the polymerization temperature is more preferably from −20° C. to 80° C., and further preferably from −10° C. to 40° C.

The time required for carrying out the polymerization reaction is determined, as appropriate, depending on the presence or absence of an oxidizer, the type and amount of the oxidizer, polymerization temperature, etc. It is generally from 0.5 to 100 hours. Taking into account productivity, polymerization is preferably carried out under polymerization conditions in which the polymerization time is approximately 10 to 40 hours.

Further, the method for producing the dispersion of the present embodiment may also comprise steps other than the above described polymerization step. For example, a purification step of removing an oxidizer or a low-molecular-weight product, etc. can also be added. Examples of such a purification method include a dialysis, an ion exchange method, and a centrifugal washing method. Purification can be carried out by a single purification step or by a combined use of two or more purification steps. A more preferred method for removing unreacted conductive polymer monomers, polyvinyl sulfonic acid, an oxidizer, and a residual oxidizer by a purification step is a method of carrying out two steps of removing cations and anions by an ion exchange method, and precipitating a composite by centrifugation, washing the precipitate, and removing components other than the composite dissolved and/or dispersed in the solution. In particular, a decrease in the contents of the decomposed products of polyvinyl sulfonic acid or residual oxidizers would lead to the improvement of the conductivity of the finally obtained conducting layer or the heat resistance of the conducting layer.

The produced dispersion may also be homogenized using a rotary homogenizer or an ultrasonic homogenizer. Thereby, there can be obtained a dispersion in which the mean particle diameter of a dispersoid is 10 μm to 1 nm.

It is also possible to add various additives to the produced dispersion. The type of such an additive is not particularly limited. Examples of the additive include a water-soluble compound having a hydroxyl group, water-soluble sulfoxide, a water-soluble amide compound, and a water-soluble compound having a lactone structure.

The type of such a water-soluble compound having a hydroxyl group is not particularly limited, and the examples include polyhydric alcohol and a derivative thereof. The type of such polyhydric alcohol is not particularly limited, and the examples include glycerine and ethylene glycol. The type of a derivative of polyhydric alcohol is not particularly limited, and the examples include polyhydric alcohol monoethers such as diethylene glycol monoethyl ether.

The type of such water-soluble sulfoxide is not particularly limited, and the examples include dimethyl sulfoxide and diethyl sulfoxide.

The type of such a water-soluble amide compound is not particularly limited, and the examples include N,N-dimethylformamide and N-methylpyrrolidone.

The type of such a water-soluble compound having a lactone structure is not particularly limited, and the examples include γ-butyrolactone and γ-valerolactone.

These additives may be used either singly or in combination of two or more types.

In general, the additive is used in an amount of preferably 0.1% to 50% by weight, and preferably 1% to 20% by weight, based on the total weight of a dispersion.

Still further, additives used to improve physical properties upon film formation of the composite, such as celluloses, silicones, amines, polyurethanes, polyesters, polyamides, polyimides, polyolefins, polyethers, and poly(meth)acrylates, may also be used. Some of these additives adhere to the outside of a composite particle, whereas other additives penetrate into a composite. Silicones and amines, which can penetrate into a composite and have high compatibility with polyvinyl sulfonic acids, are extremely useful as additives having less influence on conductive performance.

Still further, other known additives, which are used in a dispersion containing a conductive polymer, can also be used herein. For example, a pigment, a dye, an antifoaming agent, a crosslinker, a stabilizer, and a surfactant can be added.

The mixed amount of these additives can be determined, as appropriate, within a range in which the advantageous effects of the present embodiment can be obtained.

<<Conducting Layer>>

The conducting layer of the present embodiment is a conducting layer produced using the above described dispersion. For example, the above described dispersion is applied onto a base material to form a film, so as to produce a conducting layer.

Specifically, according to the present embodiment, there is provided a conducting layer comprising the above described composite of the polyvinyl sulfonic acid and the conductive polymer.

The film formation method is not particularly limited. Examples of the film formation method include a casting method, a spin-coating method, a microgravure coating method, a gravure coating method, a bar coating method, a roll coating method, a wire bar coating method, a dip coating method, a spray coating method, a screen printing method, a flexographic printing method, an offset printing method, and an ink-jet printing method.

The type of the base material is not particularly limited. Examples of the base material include a plastic substrate, a non-woven fabric, a glass substrate, and a silicon substrate. These base materials may be coated with ITO, tin oxide, indium oxide or the like. The shape of the substrate may be a sheet-like, film-like, platy, or disk shape, etc.

The type of the plastic is not particularly limited. Examples of the plastic include a polyester-based resin, a polystyrene-based resin, a polyolefin-based resin such as polyethylene or polypropylene, a polyimide-based resin, a polyamide-based resin, a polysulfone-based resin, a polycarbonate-based resin, a polyvinyl chloride-based resin, a phenol-based resin, and an epoxy-based resin. These may be either single polymers or copolymers. In addition, these plastics may be used either singly or in combination of two or more types.

Drying conditions applied when the dispersion is applied onto a base material to form a film are, for example, a temperature of 20° C. to 250° C. and a period of time for 5 seconds to 5 weeks.

The thickness of the conducting layer of the present embodiment is determined, as appropriate, depending on intended use. It is preferably from 1 nm to 20 µm and more preferably from approximately 2 nm to 500 nm.

In the conducting layer of the present embodiment, the crystallinity of a composite of a conductive polymer and a polyanion can be evaluated by XRD measurement. The higher the crystallinity of the composite, the higher the conductivity of the conducting layer that can be achieved. On the other hand, the lower the crystallinity of the composite, the poorer the conductivity of the conducting layer that can be achieved.

Moreover, in the conducting layer of the present embodiment, it is preferable that there be a few insulating components between composite particles. The insulating components mean raw material-derived components dissolved in the dispersion, namely, conductive polymer monomers, polyvinyl sulfonic acid, an oxidizer and a residual oxidizer.

Furthermore, the conducting layer of the present embodiment is produced using a dispersion formed by dispersing a composite containing a conductive polymer and polyvinyl sulfonic acid in a solvent, as described above. The thus produced conducting layer has a specific peak area ratio in XRD measurement. Specifically, in the above-produced conducting layer, the peak area ratio between a peak K in which 2θ is 8° to 10° and a peak L in which 2θ is 24° to 28° (peak K area/peak L area) is 1.0 to 10.0 in a reflection method XDR measurement. The peak area ratio (peak K area/peak L area) is preferably 1.2 to 8.0, and more preferably 2.0 to 5.2. That is to say, the present inventors have found that the conductivity of a conducting layer can be enhanced by setting a peak area ratio in the XRD measurement, which is a factor for determining the distance between a polymer and a polymer in a crystal of conductive polymer that governs conductivity, within a specific range. In the conventionally known PEDOT/PSS-based composite, a clear peak has not been confirmed in a range in which 2θ is 8° to 10°. In addition, in a crystal of PEDOT alone, there are no peaks in a range in which 2θ is 8° to 10°. In the case of PEDOT in which a styrene sulfonic acid monomer is used as a dopant, a peak of diffraction angle is observed around the angle. However, since the dopant is a monomer, performance is significantly fluctuated, and thus, it cannot be expected to have a stable conductivity. In contrast, since the above described polyvinyl sulfonic acid is used in the conducting layer of the present embodiment, an extremely stable crystal of conductive polymer/polysulfonic acid could be observed.

It is to be noted that, in the present embodiment, the reflection method XRD measurement is a measurement method described in the after-mentioned Examples.

In the XRD measurement method of the conducting layer, as the diffraction angle 2θ becomes smaller in the range of 8° to 10°, the distance between a conductive polymer and a conductive polymer preferably becomes shorter. However, if the diffraction angle 2θ becomes smaller than 8°, it is problematic in that the abundance of sulfonic acid that should be present between conductive molecules is reduced, and in that the doped state becomes weak, resulting in a decrease in conductivity.

The type of a conductive polymer capable of forming a conducting layer, in which the peak area ratio between a peak K in which 2θ is 8° to 10° and a peak L in which 2θ is 24° to 28° (peak K area/peak L area) is 1.0 to 10.0 in the XRD measurement, is not particularly limited. A polymer having a structure of a long chain in which double bonds and single bonds are alternatively disposed in a polymer structure thereof is preferable. The type of such a polymer is not particularly limited. Examples of the polymer include: polyaryls including, as typical examples, poly(p-phenylene), poly(o-phenylene), poly(m-phenylene), poly(2,6-naphthalene) and poly(9,10-anthracene); heteroaromatics including, as typical examples, polypyrrole, polythiophene, polyfuran, poriserefen, polypyridine, polypyridazine, poly(2,2'-bipyridine) and polypyrimidine; polyarylvinylenes including, as typical examples, poly(p-phenylenevinylene) and poly(1,4-naphthalenevinylene); polyanilines; and polyacetylenes. All types of functional groups may bind to the above described polymer. From the viewpoint of the stability of a crystal, the conductive polymers are preferably heteroaromatics, and more preferably polypyrrole and polythiophene. A particularly preferred polythiophene has a structural unit represented by the following formula (I):

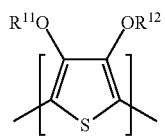

wherein $R^{11}$ and $R^{12}$ each independently represent hydrogen or an alkyl group having 1 to 5 carbon atoms, or they form together an alkylene group having 1 to 5 carbon atoms, and the alkylene group may be optionally substituted.

The above-mentioned alkyl group may be either a linear or branched alkyl group. The type of such an alkyl group is not particularly limited. Examples of the alkyl group include a methyl group, an ethyl group, and a propyl group.

The type of the above-mentioned alkylene group is not particularly limited. Examples of the alkylene group include a methylene group, an ethylene group, and a propylene group.

The substituent optionally possessed by the above-mentioned alkylene group is not particularly limited. Examples of the substituent include a methyl group, an ethyl group, a hydroxy methyl group, and a hydroxy ethyl group.

It is preferable that the conducting layer of the present embodiment comprise poly(3,4-ethylenedioxythiophene), and that, in the reflection method XDR measurement, the peak area ratio between a peak K in which 2θ is 8° to 10° and a peak L in which 2θ is 24° to 28° (peak K area/peak L area) be 1.0 to 10.0.

The type of polyvinyl sulfonic acid capable of forming a conducting layer, in which the peak area ratio between a peak K in which 2θ is 8° to 10° and a peak L in which 2θ is 24° to 28° (peak K area/peak L area) is 1.0 to 10.0 in the XRD measurement, is not particularly limited. It is preferable to use polyvinyl sulfonic acid having a small content of sulfonic acid monomer that has an aromatic ring in a space from a high-molecular-weight main chain to a sulfonic acid group (hereinafter also abbreviated as a "side-chain aromatic ring-containing sulfonic acid monomer"). If two side-chain aromatic ring-containing sulfonic acid monomer units are adjacent to each other in polyvinyl sulfonic acid, the two aromatic rings react against each other. As a result, the aromatic rings are located at positions apart from the main chain as a center, and thus, the linearity of the polyvinyl sulfonic acid is increased. Therefore, the content of aromatic ring-containing sulfonic acid monomer units in the polyvinyl sulfonic acid is preferably as small as possible. Specifically, the content of the aromatic ring-containing sulfonic acid monomer units is preferably 50 mol % or less, and more preferably 10 mol % or less.

A preferred polyvinyl sulfonic acid capable of forming the above described conducting layer is a polyvinyl sulfonic acid containing a monomer unit derived from a vinyl sulfonic acid monomer represented by the following general formula (1)':

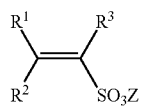

(1)' wherein $R^1$, $R^2$ and $R^3$ each independently represent hydrogen, or an alkyl group or alkylene group, which has 1 to 15 carbon atoms; and Z represents hydrogen, halogen, an alkyl group or alkylene group, which has 1 to 15 carbon atoms, a metal ion, an ammonium ion, a protonated primary, secondary or tertiary amine, or a quaternary ammonium ion.

The type of the vinyl sulfonic acid monomer represented by the general formula (1)' is not particularly limited. Representative examples of the vinyl sulfonic acid monomer include: alkyl-substituted vinyl sulfonic acids such as 1-alkyl vinyl sulfonic acid, 2-alkyl vinyl sulfonic acid, and 1,2-alkyl sulfonic acid; sulfonates such as sodium vinyl sulfonate, sodium 1-alkyl vinyl sulfonate, potassium vinyl sulfonate, ammonium vinyl sulfonate, and vinyl sulfonic acid alkyl amine salts; sulfonic acid halides such as vinyl sulfonic acid fluoride and vinyl sulfonic acid chloride; and vinyl sulfonic acid. Among these compounds, preferred monomers include vinyl sulfonic acid and vinyl sulfonate, in which $R^1$, $R^2$ and $R^3$ each represent hydrogen, and Z represents hydrogen, sodium or potassium.

A more preferred polyvinyl sulfonic acid is a polyvinyl sulfonic acid, in which the molar amount of sulfonic acid groups derived from vinyl sulfonic acid monomers represented by the general formula (1)' is set in the range of 50.0 to 98.0 mol % with respect to the molar amount of total monomer units. The sulfonic acid group includes an anhydride obtained by dehydration and condensation of two molecules of sulfonic acid. A polyvinyl sulfonic acid, which includes an anhydride obtained by performing a heat treatment and then performing dehydration and condensation of two molecules of sulfonic acid groups, as well as desulfonation, is a preferred polymer.

The conducting layer of the present embodiment is produced using the above described dispersion, and it has high electric conductivity and low surface resistivity. The ranges of electric conductivity and surface resistivity can be determined depending on intended use. According to the present embodiment, there can also be obtained a conducting layer having an electric conductivity value of preferably 0.01 to 1,000 $Scm^{-1}$ and particularly preferably 0.1 to 500 $Scm^{-1}$, and also having a surface resistivity of preferably 100,000 to 5Ω/□ and particularly preferably 200 to 10Ω/□.

Moreover, polyvinyl sulfonic acid constituting the conducting layer of the present embodiment has many sulfonic acid groups that are oriented to the direction of a substrate. Hence, the conducting layer of the present embodiment also has high substrate adhesion.

Because of these properties, the conducting layer of the present embodiment can be used for intended use of various optoelectronic components. For instance, the present conducting layer can be used for intended use that particularly requires high conductivity, such as a condenser, a conductive film or a conductive sheet. Specifically, the present conducting layer can be used for intended use such as a polymer light-emitting diode, an organic solar power, a secondary battery, a conductive polymer sensor, a thin film transistor device, an electroluminescence device, or an electrolytic condenser. Also, it can be used as an alternative to an ITO thin film.

EXAMPLES

Hereinafter, the present invention will be described more specifically in the following production examples, examples, and comparative examples. However, these examples are not intended to limit the scope of the present invention.

[Materials and Measurement Methods]

<Gel Permeation Chromatographic (GPC) Measurement>

As standard solutions used to measure the weight average molecular weight of each polymer, aqueous solutions each containing the standard polyethylene oxide having a molecular weight of 900000, 250000, 107000, 50000, 21000, or 4100, manufactured by Tosoh Corporation, were prepared and used.

High-performance GPC system HLC-8320 manufactured by Tosoh Corporation, with which a single TSK-GEL α guard column manufactured by Tosoh Corporation, namely, α-2500, α-3000 or α-4000, was connected, was used for GPC measurement. Measurement conditions of the system consisted of a column temperature of 40° C. and a flow rate of 1.0 ml/min. Moreover, a 0.2 M sodium nitrate aqueous solution was used as an eluent. 20 µl of an analytical sample that had been adjusted to 2 weight % by dilution with the aforementioned eluent was poured into the aforementioned system, and detection was then carried out using a refractive index detector connected with the chromatograph, so as to conduct the GPC measurement of each polymer.

In a chromatogram obtained by measuring the analytical sample with the aforementioned system, the total area of a solute in the chromatogram was defined as A, and the area of vinyl sulfonic acid was defined as B. The content (%) of vinyl sulfonic acid remaining in each polymer was calculated based on the following expression.

Remaining vinyl sulfonic acid (%)=$(B/A)\times100$

In a chromatogram obtained by measuring the analytical sample with the aforementioned system, the total area of a solute in the chromatogram was defined as A, and the area of a solute obtained after the elution time corresponding to a molecular weight of 5000 was defined as C. The content (%) of a low-molecular-weight component having a molecular weight of 5000 or less in each polymer was calculated based on the following expression.

Content (%) of low-molecular-weight component with molecular weight of 5000 or less=$(C/A)\times100$ The content (ppm) of polyvinyl sulfonic acid dissolved in each dispersion was obtained as follows. First, in a chromatogram obtained by measuring the analytical sample with the aforementioned system, the area of a solute in the chromatogram was obtained. Subsequently, the content corresponding to the obtained area was obtained based on a calibration curve that had been obtained from the chromatogram of the known content. The obtained content was defined as the content of the polyvinyl sulfonic acid.

<Measurement of Absorbance of Ultraviolet Light/Visible Light>

Using UV-2450 manufactured by Shimadzu Corporation, the absorbance at each wavelength of 255 nm, 475 nm, 525 nm, 575 nm or 800 nm was measured. Specifically, the measurement sample was dissolved in a concentration of 0.2 weight % in ion exchange water, and the obtained aqueous solution was poured in a quartz cell with an optical path length of 10 mm. Then, UV measurement was carried out under the aforementioned conditions.

<Measurement of Molar Percentage (Mol %) of Sulfonic Acid Groups Derived from Vinyl Sulfonic Acid Monomers>

Approximately 0.1 g of solid was used as a measurement sample. The measurement sample was fully dissolved in 50 ml of ion exchange water, and the obtained solution was then subjected to potentiometric titration, employing Automatic Potentiometric Titrator AT-610 manufactured by Kyoto Electronics Manufacturing Co., Ltd. or the like, and using, as a titrant, 0.1 mol/L sodium hydroxide manufactured by Sigma Aldrich. The inflection point of the obtained titration curve was defined as an end point of titration. The titer of the titrant in the end point was read, and it was then placed in the following Expression (1), so as to calculate the molar amount (mol %) of sulfonic acid groups in the polymer sample.

$$\text{Molar amount (mol \%) of sulfonic acid groups} = \frac{\text{Molar concentration of titrant} \times \frac{V}{1000} \times f}{\frac{W}{108}} \times 100 \quad (1)$$

In the above Expression (1), the unit of the molar concentration of the titrant is mol/L; V indicates the titer (mL) of the titrant; "108" indicates the molecular weight (g/mol) of vinyl sulfonic acid; W indicates the mass (g) of a polymer solid sample; and f indicates the calibration coefficient of the titrant.

<Method for Producing Conducting Layer>

The water dispersion obtained in each of examples and comparative examples was dropped on a slide glass with a size of 76×26 mm, and it was then dried at 120° C. for 30 minutes to produce a conducting layer.

<Measurement of Electric Conductivity>

The surface resistivity of the produced conducting layer was measured by a four probe method using Loresta-GP (MCP-T610) manufactured by Mitsubishi Chemical Analytech Co., Ltd. In addition, the thickness of the produced conducting layer was measured using Digimatic Indicator ID-C 112CX manufactured by Mitsutoyo Corporation. After completion of the measurement, the electric conductivity of the conducting layer was calculated by the following Expression (2).

$$\text{Electric conductivity } \sigma \text{ (S/cm)} = 1/\rho \times t \quad (2)$$

In the above Expression (2), $\rho$ indicates surface resistivity ($\Omega/\square$), and t indicates film thickness (cm).

<Stability of Water Dispersion>

The stability of the water dispersion obtained in each of examples and comparative examples was evaluated in accordance with the following standards.

<Evaluation Standards>

Good: No precipitate was generated in the water dispersion.

Poor: A precipitate was generated in the water dispersion.

<X-Ray Diffraction (XRD) Measurement>

Employing Ultima-IV manufactured by Rigaku Corporation, the XRD measurement of each conducting layer was carried out at an X-ray wavelength of 0.154 nm, in a scanning range that is 2θ=5 to 60 deg (counted by 0.02 deg), and at a scanning rate of 4.0 deg/min. In order to quantitatively evaluate the obtained XRD profile, peak separation was carried out by the following method.

<Peak Separation Method>

A line that connects the hem on the low angle side (2θ=19° peak) with the hem on the wide angle side (2θ=26° peak) was defined as a background, and it was subtracted from the reflection method XRD profile. Thereafter, in the range of 5°<2θ<30° in which the peak was observed, the XRD profile after completion of background adjustment was subjected to peak separation in 5 Gaussian distributions (the following Expression 5) in which 2θ=3°, 9°, 19°, 23°, and 26° was each defined as an initial value of peak position.

$$I = A\exp\left[-\left(\frac{2\theta - B}{C}\right)^2\right] \quad \text{Expression 5}$$

In the above Expression 5, I indicates strength, and A, B and C indicate constants.

The peak of 2θ=3° was a peak inserted to adjust the background that had not sufficiently adjusted with the line background, and B in the Expression 5 was fixed whereas A and C were defined as variational parameters. With regard to other peaks, all of A, B and C were defined as variational parameters.

For peak separation, Igor Pro 6.22A manufactured by Wavematrics was used.

The peak area ratio E between a peak K in which 2θ is 8° to 10° and a peak L in which 2θ is 24° to 28° was obtained by the following expression.

$$E = (\text{area of peak } K)/(\text{area of peak } L)$$

<Measurement of Particle Diameter>

The mean particle diameter of a dispersoid in each dispersion was measured under the following conditions, employing FPAR-1000 manufactured by Otsuka Electronics Co., Ltd.

Measurement sample: dispersion that was 50-fold diluted with ion exchange water

Measurement probe: dilution-system probe

Particle diameter analysis: MARQUARDT method

<Heat Resistant Test>

The conducting layer in the present examples was subjected to the following heat resistant test. First, the dispersion was spin-coated on a slide glass with a size of 25×25 mm, and it was then dried at 100° C. for 30 minutes to produce a conducting layer. The conducting layer was placed in a small high-temperature chamber manufactured by Espec Corporation, and it was then heated at 135° C. for 55 hours. Before and after the heating operation, the surface resistivity of the conducting layer was measured by a four probe method using Loresta-GP (MCP-T610) manufactured by Mitsubishi Chemical Analytech Co., Ltd. An increase rate in the surface resistivity of the conducting layer by heating was obtained by the following expression.

(Increase rate in surface resistivity)={(surface resistivity after heating)−(surface resistivity before heating)}/(surface resistivity before heating)

It was concluded that the smaller such an increased rate in the surface resistivity is, the higher the heat resistance can be obtained.

<Solid NMR Measurement>

The solid NMR measurement of the polyvinyl sulfonic acid in the present Examples was carried out under the following conditions, employing ECA700 manufactured by JEOL Ltd.
Measurement nucleus: $^{13}C$
Measurement method: CP/MAS method
Observing frequency: 176.05 MHz
Analytical sample tube: 4 mmϕ NMR tube
MAS: 10 kHz
Cumulated number: 1000

Moreover, the solid NMR measurement of the conducting layer in the present Examples was carried out under the same conditions as those described above, with the exceptions that the analytical sample had previously been mixed with 7 times its volume of KBr and the mixture had been then placed into the NMR tube, and that the cumulated number was set at 12000.

Production Example 1

Preparation of Polyvinyl Sulfonic Acid

Weight average molecular weight Mw: $9.6 \times 10^3$ 1120 g of ion exchange water was added into a 2000-mL glass flask equipped with a paddle-type impeller, a Dimroth condenser, a thermometer and a nitrogen introduction tube, and thereafter, 480 g of vinyl sulfonic acid ($CH_2$=CH—$SO_3H$, manufactured by Asahi Kasei Finechem Co., Ltd.; hereinafter also referred to as "VSA") was mixed with the ion exchange water, while stirring and cooling. Subsequently, 0.480 g of 2,2'-azobis(2-methylpropionamidine)dihydrochloride (manufactured by Wako Pure Chemical Industries, Ltd.; hereinafter also referred to as "V-50") was added as a radical polymerization initiator to the aforementioned flask, and nitrogen bubbling was then continued for 30 minutes for nitrogen substitution. Thereafter, the aqueous solution in the flask was stirred at 60° C. for 11 hours, and 0.486 g of the radical polymerization initiator V-50 was added to the resulting solution. The obtained mixture was stirred at 60° C. for 6 hours. Thereafter, 0.482 g of the radical polymerization initiator V-50 was further added to the reaction solution, and the temperature of the mixture was then increased to 70° C., followed by stirring for 10 hours, so as to obtain a polyvinyl sulfonic acid (PVS) aqueous solution. The obtained polyvinyl sulfonic acid (PVS) was measured by GPC. As a result, the weight average molecular weight was $9.6 \times 10^3$, and the remaining VSA was 0.4%.

Production Example 2

Preparation of Polyvinyl Sulfonic Acid

Weight average molecular weight Mw: $3.3 \times 10^4$ 736 g of ion exchange water was added into a 2000-mL glass separable flask equipped with an anchor-type impeller, a Dimroth condenser, a thermometer and a nitrogen introduction tube, and thereafter, 864 g of VSA was mixed with the ion exchange water, while stirring and cooling. Subsequently, 0.864 g of the radical polymerization initiator V-50 was added to the aforementioned flask, and nitrogen bubbling was then continued for 30 minutes for nitrogen substitution. Thereafter, the aqueous solution in the flask was stirred at 40° C. for 11 hours, and 0.864 g of the radical polymerization initiator V-50 was added to the resulting solution. The obtained mixture was further stirred at 40° C. for 13 hours. Thereafter, the temperature of the reaction solution was increased to 70° C., and then, the solution was continuously stirred for 10 hours, so as to obtain a polyvinyl sulfonic acid (PVS) aqueous solution. The obtained polyvinyl sulfonic acid (PVS) was measured by GPC. As a result, the weight average molecular weight was $3.3 \times 10^4$, and the remaining VSA was 0.2%.

Production Example 3

Preparation of Polyvinyl Sulfonic Acid

Weight average molecular weight Mw: $5.3 \times 10^4$ 420 g of ion exchange water was added into the same flask as that used in Production Example 2, and thereafter, 980 g of VSA was mixed with the ion exchange water, while stirring and cooling. Subsequently, 0.196 g of the radical polymerization initiator V-50 was added to the aforementioned flask, and nitrogen bubbling was then continued for 30 minutes for nitrogen substitution. Thereafter, the aqueous solution in the flask was stirred at 40° C. for 24 hours, and 0.98 g of the radical polymerization initiator V-50 was added to the resulting solution. The temperature of the reaction mixture was increased to 50° C., and then, the reaction solution was continuously stirred for 48 hours, so as to obtain a polyvinyl sulfonic acid (PVS) aqueous solution. The obtained polyvinyl sulfonic acid (PVS) was measured by GPC. As a result, the weight average molecular weight was $5.3 \times 10^4$, and the remaining VSA was 0.1%.

Production Example 4

Preparation of Polyvinyl Sulfonic Acid

Weight average molecular weight Mw: $2 \times 10^5$ 25 g of ion exchange water was added into a 500-mL glass flask equipped with a paddle-type impeller, a thermometer and a nitrogen introduction tube, and thereafter, 225 g of VSA was mixed with the ion exchange water, while stirring and cooling. Subsequently, 1.125 g of 2,2'-azobis[2-(2-imidazolin-2-yl)propane]dihydrochloride (manufactured by Wako Pure Chemical Industries, Ltd.) was added as a radical polymerization initiator to the aforementioned flask, and nitrogen bubbling was then continued for 30 minutes for nitrogen substitution. Thereafter, the aqueous solution in the flask was stirred at 10° C. for 27 hours to obtain a polymerization solution. Using tetrahydrofuran as a reprecipitation solvent, reprecipitation purification was repeatedly performed on the obtained polymerization solution until the remaining VSA became 1% or less, so as to obtain a polyvinyl sulfonic acid (PVS) aqueous solution. The obtained polyvinyl sulfonic acid (PVS) was measured by GPC. As a result, the weight average molecular weight was $2.0 \times 10^5$, and the remaining VSA was 0.5%.

Production Example 5

Preparation of Polyvinyl Sulfonic Acid

By way of Potassium Salts
Weight average molecular weight Mw: $3.2 \times 10^4$ 24.16 g of ion exchange water was added into a 100-mL glass flask equipped with a paddle-type impeller, a thermometer and a nitrogen introduction tube, and thereafter, 43.11 g of VSA was mixed with the ion exchange water, while stirring and cooling. Subsequently, while cooling, an aqueous solution containing 50 weight % potassium hydroxide was added to the flask under stirring. Thereafter, 0.066 g of the radical polymerization initiator V-50 was added to the flask, and nitrogen bubbling was then continued for 30 minutes for nitrogen substitution. Thereafter, the aqueous solution in the flask was stirred at 40° C. for 40 hours for polymerization, so as to obtain a polymerization solution. The obtained polymerization solution was mixed with 917.74 g of ion exchange water, so as to prepare an aqueous solution of 5.7 weight % potassium polyvinyl-sulfonate. The thus prepared aqueous solution of potassium polyvinyl-sulfonate was supplied at a rate of 200 mL/hour into a column (inner diameter: 50 mm; height: 600 mm) filled with 400 mL of strong acid ion exchange resin (DOWEX (registered trademark) Monosphere 650C) that had previously been regenerated with hydrochloric acid, and the column was then washed with 680 g of ion exchange water to remove potassium. Thereafter, the aqueous solution, from which potassium had been removed, was subjected to vacuum concentration at 40° C. using an evaporator, so as to obtain 67.69 g of a polyvinyl sulfonic acid (PVS) aqueous solution. The obtained polyvinyl sulfonic acid (PVS) was measured by GPC. As a result, the weight average molecular weight was $3.2 \times 10^4$, and the remaining VSA was 0.6%.

Production Example 6

Preparation of Polyvinyl Sulfonic Acid

By way of Sodium Salts
Weight average molecular weight Mw: $2.9 \times 10^4$ 26.40 g of ion exchange water was added into a 100-mL glass flask equipped with a paddle-type impeller, a thermometer and a nitrogen introduction tube, and thereafter, 34.40 g of VSA was mixed with the ion exchange water, while stirring and cooling. Subsequently, while cooling, 27.10 g of an aqueous solution containing 48 weight % sodium hydroxide was added to the flask under stirring. Thereafter, 0.052 g of the radical polymerization initiator V-50 was added to the flask, and nitrogen bubbling was then continued for 30 minutes for nitrogen substitution. Thereafter, the aqueous solution in the flask was stirred at 40° C. for 45 hours for polymerization, so as to obtain a polymerization solution. The obtained polymerization solution was mixed with 522 g of ion exchange water, so as to prepare an aqueous solution of 5.6 weight % sodium polyvinyl-sulfonate. The thus prepared aqueous solution of sodium polyvinyl-sulfonate was supplied at a rate of 150 mL/hour into a column (inner diameter: 50 mm; height: 600 mm) filled with 350 mL of strong acid ion exchange resin (DOWEX (registered trademark) Monosphere 650C) that had previously been regenerated with hydrochloric acid, and the column was then washed with 540 g of ion exchange water to remove sodium. Thereafter, the aqueous solution, from which sodium had been removed, was subjected to vacuum concentration at 40° C. using an evaporator, so as to obtain 60.4 g of a polyvinyl sulfonic acid (PVS) aqueous solution. The obtained polyvinyl sulfonic acid (PVS) was measured by GPC. As a result, the weight average molecular weight was $2.9 \times 10^4$, and the remaining VSA was 0.7%.

Example 1

The PVS aqueous solution obtained in Production Example 1 was subjected to vacuum drying by heating at 50° C. for 72 hours to obtain a PVS solid. The water content of the obtained PVS solid was 13.5 weight %. 2 g of this PVS solid was added into a 100-mL beaker, and it was then subjected to a heat treatment at 110° C. for 10 hours using a fan dryer. The thus heated PVS was measured in terms of GPC, absorbance, and the molar amount of sulfonic acid groups. The results are shown in Table 1.

0.6 g of the heated PVS was added to a 60-mL glass vessel, and it was then dissolved in 38.7 g of ion exchange water. Thereafter, 0.2 g of 3.4-ethylenedioxythiophene (manufactured by Tokyo Chemical Industry Co., Ltd.; hereinafter also referred to as "EDOT") and 0.5 g of sodium persulfate (manufactured by Sigma Aldrich) were added to the solution, and they were mixed by stirring at a room temperature for 20 hours to carry out oxidative polymerization. Subsequently, 6 g of cation exchange resin and 6 g of anion exchange resin were added to the reaction mixture, and the obtained mixture was then blended by stirring for 20 hours. Thereafter, the reaction mixture was subjected to filtration and desalination, so as to obtain a water dispersion containing a composite of poly(3,4-ethylenedioxythiophene) and polyvinyl sulfonic acid. The stability of the obtained water dispersion was evaluated in the above described manner. The results are shown in Table 1. Moreover, a conducting layer was produced from the water dispersion as described above, and the electric conductivity and XRD of the produced conducting layer were then measured. The results are shown in Table 1.

Example 2

A heated PVS, a water dispersion containing a composite of poly(3,4-ethylenedioxythiophene) and polyvinyl sulfonic acid, and a conducting layer were obtained by performing the same operations as those in Example 1, with the exceptions that the PVS aqueous solution obtained in Production Example 2 was used, and that the heating time was set at 1 hour, after completion of the production of a PVS solid.

Example 3

A heated PVS, a water dispersion containing a composite of poly(3,4-ethylenedioxythiophene) and polyvinyl sulfonic acid, and a conducting layer were obtained by performing the same operations as those in Example 2, with the exception that the heating time was set at 5 hours, after completion of the production of a PVS solid.

Example 4

A heated PVS, a water dispersion containing a composite of poly(3,4-ethylenedioxythiophene) and polyvinyl sulfonic acid, and a conducting layer were obtained by performing the same operations as those in Example 2, with the exception that the heating time was set at 7.5 hours, after completion of the production of a PVS solid.

Example 5

A heated PVS, a water dispersion containing a composite of poly(3,4-ethylenedioxythiophene) and polyvinyl sulfonic acid, and a conducting layer were obtained by performing the same operations as those in Example 2, with the exception that the heating time was set at 10 hours, after completion of the production of a PVS solid.

Example 6

A heated PVS, a water dispersion containing a composite of poly(3,4-ethylenedioxythiophene) and polyvinyl sulfonic acid, and a conducting layer were obtained by performing the same operations as those in Example 2, with the exception that the heating time was set at 12.5 hours, after completion of the production of a PVS solid.

Example 7

A heated PVS, a water dispersion containing a composite of poly(3,4-ethylenedioxythiophene) and polyvinyl sulfonic acid, and a conducting layer were obtained by performing the same operations as those in Example 2, with the exception that the heating time was set at 15 hours, after completion of the production of a PVS solid.

Example 8

A heated PVS, a water dispersion containing a composite of poly(3,4-ethylenedioxythiophene) and polyvinyl sulfonic acid, and a conducting layer were obtained by performing the same operations as those in Example 2, with the exception that the heating temperature was set at 100° C. and the heating time was set at 48 hours, after completion of the production of a PVS solid.

Example 9

A heated PVS, a water dispersion containing a composite of poly(3,4-ethylenedioxythiophene) and polyvinyl sulfonic acid, and a conducting layer were obtained by performing the same operations as those in Example 2, with the exception that the heating temperature was set at 100° C. and the heating time was set at 72 hours, after completion of the production of a PVS solid.

Example 10

A heated PVS, a water dispersion containing a composite of poly(3,4-ethylenedioxythiophene) and polyvinyl sulfonic acid, and a conducting layer were obtained by performing the same operations as those in Example 2, with the exception that the heating temperature was set at 95° C. and the heating time was set at 24 hours, after completion of the production of a PVS solid.

Example 11

A heated PVS, a water dispersion containing a composite of poly(3,4-ethylenedioxythiophene) and polyvinyl sulfonic acid, and a conducting layer were obtained by performing the same operations as those in Example 2, with the exception that the heating temperature was set at 95° C. and the heating time was set at 72 hours, after completion of the production of a PVS solid.

Example 12

A heated PVS, a water dispersion containing a composite of poly(3,4-ethylenedioxythiophene) and polyvinyl sulfonic acid, and a conducting layer were obtained by performing the same operations as those in Example 2, with the exception that the heating temperature was set at 95° C. and the heating time was set at 96 hours, after completion of the production of a PVS solid.

Example 13

A heated PVS, a water dispersion containing a composite of poly(3,4-ethylenedioxythiophene) and polyvinyl sulfonic acid, and a conducting layer were obtained by performing the same operations as those in Example 2, with the exception that the heating temperature was set at 95° C. and the heating time was set at 120 hours, after completion of the production of a PVS solid.

Example 14

A heated PVS, a water dispersion containing a composite of poly(3,4-ethylenedioxythiophene) and polyvinyl sulfonic acid, and a conducting layer were obtained by performing the same operations as those in Example 2, with the exception that the heating temperature was set at 95° C. and the heating time was set at 144 hours, after completion of the production of a PVS solid.

Example 15

A heated PVS, a water dispersion containing a composite of poly(3,4-ethylenedioxythiophene) and polyvinyl sulfonic acid, and a conducting layer were obtained by performing the same operations as those in Example 2, with the exception that the heating temperature was set at 95° C. and the heating time was set at 192 hours, after completion of the production of a PVS solid.

Example 16

A heated PVS, a water dispersion containing a composite of poly(3,4-ethylenedioxythiophene) and polyvinyl sulfonic acid, and a conducting layer were obtained by performing the same operations as those in Example 2, with the exception that the heating temperature was set at 95° C. and the heating time was set at 240 hours, after completion of the production of a PVS solid.

Example 17

A heated PVS, a water dispersion containing a composite of poly(3,4-ethylenedioxythiophene) and polyvinyl sulfonic acid, and a conducting layer were obtained by performing the same operations as those in Example 1, with the exceptions that the PVS aqueous solution obtained in Production Example 3 was used, and that the heating temperature was set at 115° C. and the heating time was set at 1 hour, after completion of the production of a PVS solid.

Example 18

A heated PVS, a water dispersion containing a composite of poly(3,4-ethylenedioxythiophene) and polyvinyl sulfonic acid, and a conducting layer were obtained by performing the same operations as those in Example 17, with the exception that the heating time was set at 2 hours, after completion of the production of a PVS solid.

Example 19

A heated PVS, a water dispersion containing a composite of poly(3,4-ethylenedioxythiophene) and polyvinyl sulfonic acid, and a conducting layer were obtained by performing the same operations as those in Example 17, with the exception that the heating time was set at 4 hours, after completion of the production of a PVS solid.

Example 20

A heated PVS, a water dispersion containing a composite of poly(3,4-ethylenedioxythiophene) and polyvinyl sulfonic acid, and a conducting layer were obtained by performing the same operations as those in Example 17, with the exception that the heating temperature was set at 110° C. and the heating time was set at 3 hours, after completion of the production of a PVS solid.

Example 21

A heated PVS and a water dispersion containing a composite of poly(3,4-ethylenedioxythiophene) and polyvinyl sulfonic acid were obtained by performing the same operations as those in Example 17, with the exception that the heating temperature was set at 110° C. and the heating time was set at 4 hours, after completion of the production of a PVS solid.

Example 22

A heated PVS, a water dispersion containing a composite of poly(3,4-ethylenedioxythiophene) and polyvinyl sulfonic acid, and a conducting layer were obtained by performing the same operations as those in Example 17, with the exception that the heating temperature was set at 110° C. and the heating time was set at 5 hours, after completion of the production of a PVS solid.

Example 23

A heated PVS, a water dispersion containing a composite of poly(3,4-ethylenedioxythiophene) and polyvinyl sulfonic acid, and a conducting layer were obtained by performing the same operations as those in Example 17, with the exception that the heating temperature was set at 110° C. and the heating time was set at 7.5 hours, after completion of the production of a PVS solid.

Example 24

A heated PVS, a water dispersion containing a composite of poly(3,4-ethylenedioxythiophene) and polyvinyl sulfonic acid, and a conducting layer were obtained by performing the same operations as those in Example 17, with the exception that the heating temperature was set at 110° C. and the heating time was set at 10 hours, after completion of the production of a PVS solid.

Example 25

A heated PVS, a water dispersion containing a composite of poly(3,4-ethylenedioxythiophene) and polyvinyl sulfonic acid, and a conducting layer were obtained by performing the same operations as those in Example 17, with the exception that the heating temperature was set at 100° C. and the heating time was set at 72 hours, after completion of the production of a PVS solid.

Comparative Example 1

The same operations as those performed in Example 1 were carried out with the exception that the heat treatment was not performed after completion of the production of a PVS solid. A precipitate was generated in the obtained water dispersion.

Comparative Example 2

The same operations as those performed in Example 2 were carried out with the exception that the heat treatment was not performed after completion of the production of a PVS solid. A precipitate was generated in the obtained water dispersion.

Comparative Example 3

The same operations as those performed in Example 17 were carried out with the exception that the heat treatment was not performed after completion of the production of a PVS solid. A precipitate was generated in the obtained water dispersion.

Comparative Example 4

The same operations as those performed in Example 1 were carried out with the exceptions that the PVS aqueous solution obtained in Production Example 4 was used, and that the heat treatment was not performed after completion of the production of a PVS solid. A small amount of precipitate was generated in the obtained water dispersion.

The results obtained by performing various analyses on the heated PVS (dopants), the results obtained by evaluating the water dispersions containing composites of poly(3,4-ethylenedioxythiophene) and polyvinyl sulfonic acid, and the results obtained by measuring the electric conductivity and XRD of the conducting layers, which were all obtained in Examples 1 to 25 and Comparative Examples 1 to 4, are collectively shown in Table 1 below.

TABLE 1

| | PVS used Production example | Water content in PVS before heat treatment Mass % | Conditions for heat treatment | | ANALYSIS RESULTS OF PVS | | | |
|---|---|---|---|---|---|---|---|---|
| | | | | | Weight average molecular weight | Components with molecular weight of 5000 or less | Absorbance | |
| | | | Temperature | Time | Mw | % | 255 nm | 475 nm |
| Example 1 | 1 | 13.5 | 110 | 10 | 18,000 | 13.1 | 1.725 | 0.712 |
| Example 2 | 2 | 13.7 | 110 | 1 | 33,000 | 5.4 | 0.121 | 0.051 |
| Example 3 | 2 | 13.7 | 110 | 5 | 39,000 | 4.4 | 0.526 | 0.167 |
| Example 4 | 2 | 13.7 | 110 | 7.5 | 41,000 | 4.5 | 0.675 | 0.211 |
| Example 5 | 2 | 13.7 | 110 | 10 | 52,000 | 3.5 | 1.014 | 0.386 |
| Example 6 | 2 | 13.7 | 110 | 12.5 | 64,000 | 2.8 | 1.416 | 0.538 |
| Example 7 | 2 | 13.7 | 110 | 15 | 62,000 | 2.4 | 1.44 | 0.549 |
| Example 8 | 2 | 13.7 | 100 | 48 | 63,000 | 2.9 | 1.322 | 0.351 |
| Example 9 | 2 | 13.7 | 100 | 72 | 82,000 | 2.3 | 1.568 | 0.765 |
| Example 10 | 2 | 13.7 | 95 | 24 | 37,000 | 4.5 | 0.513 | 0.073 |
| Example 11 | 2 | 13.7 | 95 | 72 | 47,000 | 3.6 | 1.142 | 0.317 |

TABLE 1-continued

| | | | | | | | | |
|---|---|---|---|---|---|---|---|---|
| Example 12 | 2 | 13.7 | 95 | 96 | 51.000 | 3.6 | 1.338 | 0.399 |
| Example 13 | 2 | 13.7 | 95 | 120 | 52,000 | 3.3 | 1.549 | 0.512 |
| Example 14 | 2 | 13.7 | 95 | 144 | 64,000 | 3.1 | 1.505 | 0.688 |
| Example 15 | 2 | 13.7 | 95 | 192 | 68,000 | 2.9 | 1.579 | 0.801 |
| Example 16 | 2 | 13.7 | 95 | 240 | 83,000 | 3.1 | 1.623 | 0.826 |
| Example 17 | 3 | 13.0 | 115 | 1 | 60,000 | 0.8 | 0.122 | 0.115 |
| Example 18 | 3 | 13.0 | 115 | 2 | 69,000 | 0.8 | 0.233 | 0.105 |
| Example 19 | 3 | 13.0 | 115 | 4 | 100,000 | 0.7 | 0.765 | 0.331 |
| Example 20 | 3 | 13.0 | 110 | 3 | 64,000 | 1.0 | 0.327 | 0.127 |
| Example 21 | 3 | 13.0 | 110 | 4 | 75,000 | 0.8 | 0.425 | 0.189 |
| Example 22 | 3 | 13.0 | 110 | 5 | 122,000 | 0.7 | 0.519 | 0.211 |
| Example 23 | 3 | 13.0 | 110 | 7.5 | 161,000 | 0.5 | 0.875 | 0.325 |
| Example 24 | 3 | 13.0 | 110 | 10 | 210,000 | 0.5 | 1.009 | 0.417 |
| Example 25 | 3 | 13.0 | 100 | 72 | 97,000 | 0.7 | 1.527 | 0.851 |
| Comparative Example 1 | 1 | 13.5 | — | — | — | 32.1 | 0 | 0 |
| Comparative Example 2 | 2 | 13.7 | — | — | — | 5.5 | 0 | 0 |
| Comparative Example 3 | 3 | 13.0 | — | — | — | 1.7 | 0 | 0 |
| Comparative Example 4 | 4 | 12.3 | — | — | — | 0.3 | 0 | 0 |

| | ANALYSIS RESULTS OF PVS | | | | Evaluation results of water dispersion | Evaluation results of conducting layer | |
|---|---|---|---|---|---|---|---|
| | Absorbance | | | Sulfonic acid groups | Stability of water | XRD AREA RATIO E | Electric conductivity |
| | 525 nm | 575 nm | 800 nm | mol % | dispersion | (K/L) | S/cm |
| Example 1 | 0.832 | 0.633 | 0.623 | 84.9 | Good | 1.10 | 1.1 |
| Example 2 | 0.061 | 0.040 | 0.010 | 97.1 | Good | 1.25 | 1.7 |
| Example 3 | 0.253 | 0.174 | 0.012 | 95.2 | Good | 1.99 | 33 |
| Example 4 | 0.329 | 0.242 | 0.074 | 95.3 | Good | 1.82 | 28 |
| Example 5 | 0.538 | 0.422 | 0.141 | 86.1 | Good | 2.29 | 42 |
| Example 6 | 0.689 | 0.591 | 0.272 | 91.0 | Good | 1.80 | 25 |
| Example 7 | 0.694 | 0.593 | 0.262 | 91.8 | Good | 1.76 | 27 |
| Example 8 | 0.465 | 0.285 | 0.129 | 97.4 | Good | 1.72 | 24 |
| Example 9 | 0.821 | 0.489 | 0.328 | 96.4 | Good | 2.10 | 19 |
| Example 10 | 0.077 | 0.042 | 0 | 95.2 | Good | 1.55 | 15 |
| Example 11 | 0.367 | 0.301 | 0.087 | 95.6 | Good | 3.23 | 30 |
| Example 12 | 0.445 | 0.370 | 0.116 | 94.4 | Good | 1.60 | 18 |
| Example 13 | 0.473 | 0.363 | 0.044 | 91.6 | Good | 1.65 | 18 |
| Example 14 | 0.791 | 0.678 | 0.27 | 91.1 | Good | 1.83 | 28 |
| Example 15 | 0.927 | 0.815 | 0.411 | 91.1 | Good | 1.50 | 13 |
| Example 16 | 0.972 | 0.880 | 0.519 | 90.8 | Good | 1.32 | 6 |
| Example 17 | 0.067 | 0.051 | 0.046 | 96.9 | Good | 1.25 | 1.7 |
| Example 18 | 0.123 | 0.107 | 0.074 | 93.8 | Good | 1.33 | 5.5 |
| Example 19 | 0.358 | 0.238 | 0.098 | 94.8 | Good | 1.35 | 7 |
| Example 20 | 0.169 | 0.113 | 0.074 | 96.2 | Good | 1.35 | 6.2 |
| Example 21 | 0.216 | 0.198 | 0.081 | 95.3 | Good | 1.45 | 11 |
| Example 22 | 0.241 | 0.233 | 0.106 | 96.4 | Good | 1.47 | 12 |
| Example 23 | 0.437 | 0.381 | 0.139 | 96.0 | Good | 1.26 | 1.7 |
| Example 24 | 0.521 | 0.417 | 0.188 | 95.7 | Good | 1.27 | 2.6 |
| Example 25 | 0.901 | 0.805 | 0.237 | 94.7 | Good | 1.52 | 14 |
| Comparative Example 1 | 0 | 0 | 0 | 99.7 | Poor, Precipitate generated | 0 | Immeasurable |
| Comparative Example 2 | 0 | 0 | 0 | 99.2 | Poor, Precipitate generated | 0 | $2.0 \times 10^{-4}$ |
| Comparative Example 3 | 0 | 0 | 0 | 99.5 | Poor, Precipitate generated | 0 | $1.1 \times 10^{-4}$ |
| Comparative Example 4 | 0 | 0 | 0 | 99.5 | Poor, Precipitate generated | 0 | $2.5 \times 10^{-4}$ |

Example 26

The same operations as those performed in Example 10 were carried out with the exception that the used amount of the heated PVS was set at 0.4 g, so as to obtain a water dispersion containing a composite of poly(3,4-ethylenedioxythiophene) and polyvinyl sulfonic acid. This water dispersion was stable, and no precipitate was generated therein. In addition, the electric conductivity of a conducting layer obtained from this water dispersion was 5 S/cm. The weight ratio of components other than a conductive polymer component to the conductive polymer component, which was calculated from the added ratio of the components, was 2.0.

Example 27

The same operations as those performed in Example 10 were carried out with the exception that the used amount of the heated PVS was set at 0.8 g, so as to obtain a water dispersion containing a composite of poly(3,4-ethylenedioxythiophene) and polyvinyl sulfonic acid. This water dispersion was stable, and no precipitate was generated therein. In addition, the electric conductivity of a conducting layer obtained from this water dispersion was 20 S/cm. The weight ratio of components other than a conductive polymer component to the conductive polymer component, which was calculated from the added ratio of the components, was 4.0.

Example 28

The same operations as those performed in Example 11 were carried out with the exception that the used amount of the heated PVS was set at 0.4 g, so as to obtain a water dispersion containing a composite of poly(3,4-ethylenedioxythiophene) and polyvinyl sulfonic acid. This water dispersion was stable, and no precipitate was generated therein. In addition, the electric conductivity of a conducting layer obtained from this water dispersion was 23 S/cm. The weight ratio of components other than a conductive polymer component to the conductive polymer component, which was calculated from the added ratio of the components, was 2.0.

Example 29

The same operations as those performed in Example 11 were carried out with the exception that the used amount of the heated PVS was set at 0.8 g, so as to obtain a water dispersion containing a composite of poly(3,4-ethylenedioxythiophene) and polyvinyl sulfonic acid. This water dispersion was stable, and no precipitate was generated therein. In addition, the electric conductivity of a conducting layer obtained from this water dispersion was 29 S/cm. The weight ratio of components other than a conductive polymer component to the conductive polymer component, which was calculated from the added ratio of the components, was 4.0.

Example 30

The same operations as those performed in Example 13 were carried out with the exception that the used amount of the heated PVS was set at 0.4 g, so as to obtain a water dispersion containing a composite of poly(3,4-ethylenedioxythiophene) and polyvinyl sulfonic acid. This water dispersion was stable, and no precipitate was generated therein. In addition, the electric conductivity of a conducting layer obtained from this water dispersion was 33 S/cm. The weight ratio of components other than a conductive polymer component to the conductive polymer component, which was calculated from the added ratio of the components, was 2.0.

Example 31

The same operations as those performed in Example 13 were carried out with the exception that the used amount of the heated PVS was set at 0.8 g, so as to obtain a water dispersion containing a composite of poly(3,4-ethylenedioxythiophene) and polyvinyl sulfonic acid. This water dispersion was stable, and no precipitate was generated therein. In addition, the electric conductivity of a conducting layer obtained from this water dispersion was 16 S/cm. The weight ratio of components other than a conductive polymer component to the conductive polymer component, which was calculated from the added ratio of the components, was 4.0.

Example 32

The same operations as those performed in Example 14 were carried out with the exception that the used amount of the heated PVS was set at 0.2 g, so as to obtain a water dispersion containing a composite of poly(3,4-ethylenedioxythiophene) and polyvinyl sulfonic acid. This water dispersion was stable, and no precipitate was generated therein. In addition, the electric conductivity of a conducting layer obtained from this water dispersion was 22 S/cm. The weight ratio of components other than a conductive polymer component to the conductive polymer component, which was calculated from the added ratio of the components, was 1.0.

Comparative Example 5

1.11 g of a polystyrene sulfonic acid (PSS) aqueous solution (manufactured by Sigma Aldrich; solid content: 18 weight %), 38.19 g of ion exchange water, 0.5 g of sodium persulfate (manufactured by Sigma Aldrich) were added to a 60-mL glass vessel, and they were then mixed by stirring. Subsequently, 0.2 g of EDOT was added to the mixture, and they were then mixed by stirring at a room temperature for 24 hours to carry out oxidative polymerization. Thereafter, 7.5 g of cation exchange resin and 7.5 g of anion exchange resin were added to the reaction mixture, and the obtained mixture was then blended by stirring for 20 hours. Thereafter, the reaction mixture was subjected to filtration and desalination, so as to obtain a water dispersion containing a composite of poly(3,4-ethylenedioxythiophene) and polystyrene sulfonic acid. The electric conductivity of a conducting layer obtained from this water dispersion was 2.7 S/cm. The weight ratio of components other than a conductive polymer component to the conductive polymer component, which was calculated from the added ratio of the components, was 1.0.

Comparative Example 6

The same operations as those performed in Comparative Example 5 were carried out with the exception that the mixed amount of the PSS aqueous solution was set at 2.22 g and the mixed amount of the ion exchange water was set at 37.08 g, so as to obtain a water dispersion containing a composite of poly(3,4-ethylenedioxythiophene) and polystyrene sulfonic acid. The electric conductivity of a conducting layer obtained from this water dispersion was 3.2 S/cm. The weight ratio of components other than a conductive polymer component to the conductive polymer component, which was calculated from the added ratio of the components, was 2.0.

Comparative Example 7

The same operations as those performed in Comparative Example 5 were carried out with the exception that the mixed amount of the PSS aqueous solution was set at 3.33 g and the mixed amount of the ion exchange water was set at 35.97 g, so as to obtain a water dispersion containing a composite of poly(3,4-ethylenedioxythiophene) and polystyrene sulfonic acid. The electric conductivity of a conducting layer obtained from this water dispersion was 4.3 S/cm. The weight ratio of components other than a conductive polymer component to the conductive polymer component, which was calculated from the added ratio of the components, was 3.0.

Comparative Example 8

The same operations as those performed in Comparative Example 5 were carried out with the exception that the mixed amount of the PSS aqueous solution was set at 4.44 g and the mixed amount of the ion exchange water was set at 34.86 g, so as to obtain a water dispersion containing a composite of poly(3,4-ethylenedioxythiophene) and polystyrene sulfonic acid. The electric conductivity of a conducting layer obtained from this water dispersion was 3.2 S/cm. The weight ratio of components other than a conductive polymer component to the conductive polymer component, which was calculated from the added ratio of the components, was 4.0.

The results obtained by performing various analyses on the heated PVS (dopants), the results obtained by evaluating the water dispersions containing composites of poly(3,4-ethylenedioxythiophene) and polyvinyl sulfonic acid or polystyrene sulfonic acid, and the results obtained by measuring the electric conductivity of conducting layers, which were all obtained in Examples 26 to 32 and Comparative Examples 5 to 8, are collectively shown in Table 2.

Example 25-1

A heated PVS, a water dispersion containing a composite of poly(3,4-ethylenedioxythiophene) and polyvinyl sulfonic acid, and a conducting layer were obtained by performing the same operations as those in Example 1, with the exceptions that the PVS aqueous solution obtained in Production Example 2 was used, and that the heating temperature was set at 130° C. and the heating time was set at 1 hour, after completion of the production of a PVS solid. The results obtained by performing various analyses on the heated PVS (dopants), the results obtained by evaluating the water dispersions containing a composites of poly(3,4-ethylenedioxythiophene) and polyvinyl sulfonic acid, and the results obtained by measuring the electric conductivity and XRD of the conducting layers are shown in Table 1-1.

Example 25-2

A heated PVS, a water dispersion containing a composite of poly(3,4-ethylenedioxythiophene) and polyvinyl sulfonic acid, and a conducting layer were obtained by performing the same operations as those in Example 1, with the exceptions that the PVS aqueous solution obtained in Production Example 2 was used, and that the heating temperature was set at 150° C. and the heating time was set at 1 hour, after completion of the production of a PVS solid. The results obtained by performing various analyses on the heated PVS (dopants), the results obtained by evaluating the water dispersions containing a composites of poly(3,4-ethylenedioxythiophene) and polyvinyl sulfonic acid, and the results obtained by measuring the electric conductivity and XRD of the conducting layers are shown in Table 1-1.

Example 25-3

The PVS aqueous solution obtained in Production Example 3 was subjected to vacuum drying by heating at 50° C. for 72 hours to obtain a PVS solid. Thereafter, 2 g of this PVS solid was added into a 100-mL beaker, and it was then subjected to a heat treatment at 90° C. for 480 hours using a fan dryer. The thus heated PVS was measured in terms of GPC, absorbance, and the molar amount of sulfonic acid groups, as described above. The results are shown in Table 1-1.

Subsequently, 0.6 g of the heated PVS was added to a 60-mL glass vessel, and it was then dissolved in 37.8 g of ion exchange water. Thereafter, 0.6 g of EDOT and 0.96 g of ammonium persulfate (manufactured by Sigma Aldrich) were added to the solution, and they were mixed by stirring at 0° C. for 30 hours to carry out oxidative polymerization. Subsequently, 6 g of cation exchange resin and 6 g of anion exchange resin were added to the reaction mixture, and the obtained mixture was then blended by stirring for 20 hours. Thereafter, the reaction mixture was subjected to filtration and desalination, so as to obtain a water dispersion containing a composite of poly(3,4-ethylenedioxythiophene) and polyvinyl sulfonic acid. The stability of the obtained water dispersion was evaluated in the above described manner. The results are shown in Table 1-1. Moreover, a conducting layer was produced from the water dispersion as described above, and the electric conductivity and XRD of the produced conducting layer were then measured. The results are shown in Table 1-1.

Example 25-4

The PVS aqueous solution obtained in Production Example 2 was subjected to vacuum drying by heating at 50° C. for 72 hours to obtain a PVS solid. Thereafter, 100 g of this PVS solid was added into a 2000-mL separable flask, and 1200 g of toluene was then added thereto to obtain a solution. The obtained solution was heated at 110° C. for 8 hours in a device equipped with a Dean-Stark apparatus, a Dimroth condenser and an impeller. Thereafter, the reaction solution was cooled, toluene was decanted, and the resultant was then dried under a reduced pressure at 50° C. at 2 torr, so as to obtain a PVS solid. In order to remove the remaining toluene, 18.0 g of the PVS solid was added into a 1000-mL eggplant flask, and was then dissolved in 750.0 g of ion exchange water. Using an evaporator, toluene and water were subjected to azeotropic distillation in a bath of 50° C. under a reduced pressure, until the toluene disappeared. The heated PVS was measured in terms of GPC, absorbance, and the molar amount of sulfonic acid groups, as described above. The results are shown in Table 1-1.

645.2 g of the above-heated PVS aqueous solution (18.0 g of PVS and 627.2 g of water) was added into a 2000-mL separable flask, and 534.7 g of ion exchange water was then added thereto. Thereafter, 6.0 g of EDOT and 14.5 g of ammonium persulfate (manufactured by Sigma Aldrich) were added to the solution, and they were mixed by stirring at 0° C. for 41 hours to carry out oxidative polymerization. Subsequently, 200 g of cation exchange resin and 200 g of anion exchange resin were added to the reaction mixture, and the obtained mixture was then blended by stirring at 20° C. for 20 hours. Thereafter, the reaction mixture was subjected to filtration and desalination, so as to obtain a water dispersion containing a composite of poly(3,4-ethylenedioxythiophene) and polyvinyl sulfonic acid. The stability of the obtained water dispersion was evaluated in the above described manner. The results are shown in Table 1-1. Moreover, a conducting layer was produced from the water dispersion as described above, and the electric conductivity and XRD of the produced conducting layer were then measured. The results are shown in Table 1-1. Furthermore, the mean particle diameter of a dispersoid in the dispersion and the concentration of PVS dissolved in the dispersion were measured in the above described manner. The mean particle diameter was 890 nm, and the PVS concentration was 1400 ppm. The conducting layer obtained from the dispersion was subjected to the above described heat resistant test. The surface resistivity of the conducting layer before heating was $2.0 \times 10^3 \Omega / \square$, and the surface resistivity of the conducting layer after heating was $1.0 \times 10^4 \Omega / \square$. The increased rate in the surface resistivity was 4.0.

Subsequently, 30 g of the obtained dispersion was added into a 30-mL test tube, and it was then centrifuged using a centrifugal separator. The separated supernatant was decanted. The amount of the decanted supernatant was 20 g. Subsequently, ion exchange water with the same weight as the removed supernatant was added to the residue, and thereafter, the mixture was fully blended by shaking for 20 minutes, was then redispersed, and was then separated again with a centrifugal separation, followed by decantation of the supernatant. PVS in this supernatant was subjected to GPC measurement, and thereafter, centrifugation, decantation of the supernatant, redispersion, and centrifugation were repeatedly carried out until no polymer peaks could be detected. Using a dispersion obtained by these centrifugation and redispersion operations, a conducting layer was produced in the above described manner, and the electric conductivity and XRD of the conducting layer were measured. The results are shown in Table 1-2. The conducting layer obtained from the dispersion was subjected to the above described heat resistant test. The surface resistivity of the conducting layer before heating was $1.5 \times 10^3 \Omega / \square$, and the surface resistivity of the conducting layer after heating was $5.3 \times 10^3 \Omega / \square$. The increased rate in the surface resistivity was 2.5.

Subsequently, the dispersion obtained by the centrifugation and redispersion operations was treated using a homogenizer, so that a dispersoid contained in the dispersion was microparticulated. Using the obtained dispersion, a conducting layer was produced in the above described manner, and the electric conductivity and XRD of the conducting layer were measured. The results are shown in Table 1-2. Moreover, the mean particle diameter of the dispersoid in the dispersion was measured in the above described manner. As a result, the mean particle diameter was 190 nm.

Example 25-5

The PVS aqueous solution obtained in Production Example 2 was subjected to vacuum drying by heating at 50° C. for 72 hours to obtain a PVS solid. Thereafter, 100 g of this PVS solid was added into a 2000-mL separable flask, and 1200 g of toluene was then added thereto to obtain a solution. The obtained solution was heated at 110° C. for 8 hours in a device equipped with a Dean-Stark apparatus, a Dimroth condenser and an impeller. Thereafter, the reaction solution was cooled, and toluene was decanted, followed by drying under a reduced pressure at 50° C. at 2 torr, so as to obtain a PVS solid. Moreover, in order to remove the remaining toluene, 18.0 g of the PVS solid was added into a 1000-mL eggplant flask, and was then dissolved in 550.0 g of ion exchange water. Using an evaporator, toluene and water were subjected to azeotropic distillation in a bath of 50° C. under a reduced pressure, until the toluene disappeared.

The thus heated PVS was measured in terms of GPC, absorbance, and the molar amount of sulfonic acid groups. The results are shown in Table 1-1. Furthermore, the solid NMR of the heated PVS was measured as described above. The results are shown in FIG. 1. In the measurement results of solid NMR shown in FIG. 1, the peak around 32 ppm can be attributed to methylene carbon, whereas the peak around 56 ppm can be attributed to carbon binding to a sulfo group.

453.8 g of the above-heated PVS aqueous solution (18.0 g of PVS and 435.8 g of water) was added into a 2000-mL separable flask, and 714.9 g of ion exchange water was then added thereto. Thereafter, 12.0 g of EDOT and 19.3 g of ammonium persulfate (manufactured by Sigma Aldrich) were added to the solution, and they were mixed by stirring at 0° C. for 28 hours to carry out oxidative polymerization. Subsequently, 200 g of cation exchange resin and 300 g of anion exchange resin were added to the reaction mixture, and the obtained mixture was then blended by stirring at 20° C. for 20 hours. Thereafter, the reaction mixture was subjected to filtration and desalination, so as to obtain a water dispersion containing a composite of poly(3,4-ethylenedioxythiophene) and polyvinyl sulfonic acid. The stability of the obtained water dispersion was evaluated in the above described manner. The results are shown in Table 1-1. Moreover, a conducting layer was produced from the water dispersion as described above, and the electric conductivity and XRD of the produced conducting layer were then measured. The results are shown in Table 1-1. Furthermore, the mean particle diameter of a dispersoid in the dispersion and the concentration of PVS dissolved in the dispersion were measured in the above described manner. The mean particle diameter was 980 nm, and the PVS concentration was 890 ppm.

Still further, 30 g of the obtained dispersion was added into a 30-mL test tube, and it was then centrifuged using a centrifugal separator. The separated supernatant was decanted. The amount of the decanted supernatant was 22 g. Subsequently, ion exchange water with the same weight as the removed supernatant was added to the residue, and then, the mixture was fully blended by shaking for 20 minutes, was then redispersed, and was then separated again with a centrifugal separation, followed by decantation of the supernatant. PVS in this supernatant was subjected to GPC measurement, and thereafter, centrifugation, decantation of the supernatant, redispersion, and centrifugation were repeatedly carried out until no polymer peaks could be detected. Using a dispersion obtained by these centrifugation and redispersion operations, a conducting layer was produced in the above described manner, and the electric conductivity and XRD of the conducting layer were measured. The results are shown in Table 1-2.

Figure 2:
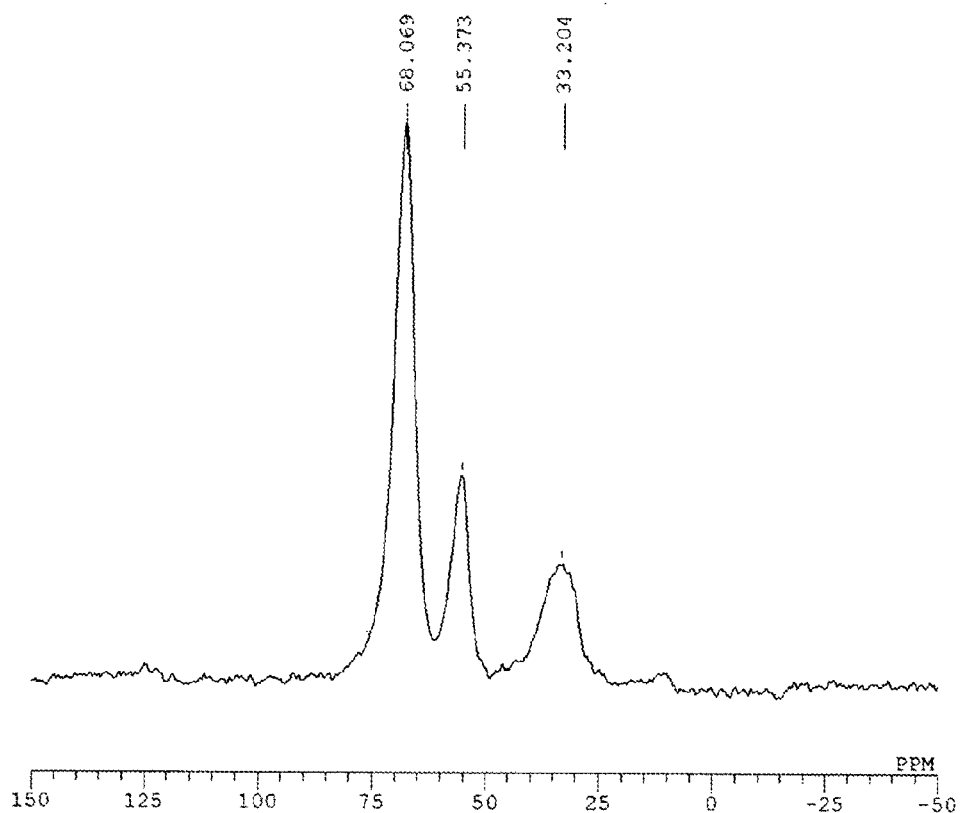
FIG. 2 is an example of the solid NMR measurement results of the conducting layers obtained in the Examples.

Subsequently, the dispersion obtained by the centrifugation and redispersion operations was treated using a homogenizer, so that a dispersoid contained in the dispersion was microparticulated. Using the obtained dispersion, a conducting layer was produced in the above described manner, and the electric conductivity and XRD of the conducting layer were measured. The results are shown in Table 1-2. Moreover, the mean particle diameter of the dispersoid in the dispersion was measured in the above described manner. As a result, the mean particle diameter was 350 nm. The conducting layer portion was disintegrated into a powder state, and the solid NMR thereof was then measured in the above described manner. The obtained measurement chart is shown in FIG. 2. In the chart of the solid NMR shown in FIG. 2, the peak around 33 ppm can be attributed to methylene carbon of PVS, the peak around 55 ppm can be attributed to carbon, to which a sulfo group of PVS binds, and the peak around 68 ppm can be attributed to carbon in the —O—CH$_2$—CH$_2$—O— portion of PEDOT. Carbon in the thiophene ring portion of PEDOT has paramagnetism as a result of doping, and no peaks are observed in the chart of the solid NMR (described in J. Am. Chem. Soc., 125, 15151-15162 (2003)).

Comparative Example 10

A conducting layer was produced from the PEDOT/PSS dispersion manufactured by Aldrich (product name: Poly(3,4-ethylenedioxythiophene)-poly(styrenesulfonate) 1.3 wt % dispersion in H$_2$O, conductive grade; product number: 483095) in the above described manner, and the electric conductivity and XRD of the conducting layer were then measured. The evaluation results are shown in Table 1-3. The conducting layer obtained from the dispersion was subjected to the above described heat resistant test. The surface resistivity of the conducting layer before heating was $1.0 \times 10^5 \Omega/\square$, and the surface resistivity of the conducting layer after heating was $1.9 \times 10^6 \Omega/\square$. The increased rate in the surface resistivity was 17.0.

Comparative Example 11

The same evaluation as that performed in Comparative Example 10 was carried out with the exception that a PEDOT/PSS dispersion (trade name: PH500) manufactured by Heraeus Materials Technology was used as a dispersion. The evaluation results are shown in Table 1-3.

Comparative Example 12

The same evaluation as that performed in Comparative Example 10 was carried out with the exception that a PEDOT/PSS dispersion (trade name: PH1000) manufactured by Heraeus Materials Technology was used as a dispersion. The evaluation results are shown in Table 1-3.

TABLE 1-2

| | Evaluation results of conducting layer after centrifugation and redispersion | | Evaluation results of conducting layer after homogenization | |
|---|---|---|---|---|
| | XRD area ratio E | Electric conductivity S/cm | XRD area ratio E | Electric conductivity S/cm |
| Example 25-4 | 5.14 | 179 | 5.21 | 187 |
| Example 25-5 | 3.87 | 120 | 3.12 | 285 |

TABLE 1-3

| | Evaluation results of conducting layer | |
|---|---|---|
| | XRD area ratio E (K/L) | Electric conductivity S/cm |
| Comparative Example 10 | 0 | 0.8 |
| Comparative Example 11 | 0 | 0.9 |
| Comparative Example 12 | 0 | 0.9 |

TABLE 1-1

| | PVS used Production example | Water content in PVS before heat treatment Mass % | Conditions for heat treatment Temperature | Conditions for heat treatment Time | Weight average molecular weight Mw | Components with molecular weight of 5000 or less % | Absorbance 255 nm | Absorbance 475 nm |
|---|---|---|---|---|---|---|---|---|
| Example 25-1 | 2 | 13.7 | 130 | 1 | 43,000 | 4.1 | 1.732 | 0.701 |
| Example 25-2 | 2 | 13.7 | 150 | 1 | 61,000 | 2.5 | 1.926 | 0.856 |
| Example 25-3 | 3 | 13.7 | 90 | 480 | 190,000 | 0.4 | 0.311 | 0.109 |
| Example 25-4 | 2 | 13.7 | 110 | 8 | 43,000 | 2.3 | 1.562 | 0.562 |
| Example 25-5 | 2 | 13.7 | 110 | 8 | 43,000 | 2.3 | 1.562 | 0.562 |

| | ANALYSIS RESULTS OF PVS Absorbance 525 nm | Absorbance 575 nm | Absorbance 800 nm | Sulfonic acid groups mol % | Evaluation results of water dispersion Stability of water dispersion | Evaluation results of conducting layer XRD AREA RATIO E (K/L) | Electric conductivity S/cm |
|---|---|---|---|---|---|---|---|
| Example 25-1 | 0.867 | 0.668 | 0.432 | 78.0 | Good | 1.33 | 5.1 |
| Example 25-2 | 0.891 | 0.751 | 0.465 | 62.3 | Good | 1.29 | 3.2 |
| Example 25-3 | 0.128 | 0.085 | 0.113 | 97.5 | Good | 3.75 | 134 |
| Example 25-4 | 0.717 | 0.583 | 0.302 | 96.0 | Good | 3.45 | 107 |
| Example 25-5 | 0.717 | 0.583 | 0.302 | 96.0 | Good | 3.56 | 110 |

TABLE 2

| | PVS used Production example | Conditions for heat treatment | | ANALYSIS RESULTS OF PVS | | | | | | Weight ratio EDOT/PVS upon addition | Evaluation results of water dispersion Stability of water dispersion | Evaluation results of conducting layer Electric conductivity S/cm | Per unit weight Electric conductivity S/cm |
|---|---|---|---|---|---|---|---|---|---|---|---|---|---|
| | | | | Absorbance | | | | | Sulfonic acid groups mol % | | | | |
| | | Temperature | Time | 255 nm | 475 nm | 525 nm | 575 nm | 800 nm | | | | | |
| Example 26 | 2 | 95 | 24 | 0.623 | 0.073 | 0.067 | 0.050 | 0.012 | 94.5 | 1/2 | Good | 5 | 1.7 |
| Example 27 | 2 | 95 | 24 | 0.587 | 0.071 | 0.071 | 0.049 | 0.007 | 94.2 | 1/4 | Good | 20 | 4.0 |
| Example 28 | 2 | 95 | 72 | 1.250 | 0.310 | 0.388 | 0.301 | 0.047 | 93.2 | 1/2 | Good | 23 | 7.7 |
| Example 29 | 2 | 95 | 72 | 1.213 | 0.312 | 0.332 | 0.302 | 0.032 | 92.9 | 1/4 | Good | 29 | 5.8 |
| Example 30 | 2 | 95 | 120 | 1.532 | 0.515 | 0.453 | 0.362 | 0.040 | 91.5 | 1/2 | Good | 33 | 11.0 |
| Example 31 | 2 | 95 | 120 | 1.547 | 0.510 | 0.463 | 0.362 | 0.023 | 91.5 | 1/4 | Good | 16 | 3.2 |
| Example 32 | 2 | 95 | 144 | 1.518 | 0.686 | 0.781 | 0.677 | 0.215 | 91.3 | 1/1 | Good | 22 | 11.0 |
| Comparative Example 5 | PSS | — | — | — | — | — | — | — | — | 1/1 | Good | 2.7 | 1.4 |
| Comparative Example 6 | PSS | — | — | — | — | — | — | — | — | 1/2 | Good | 3.2 | 1.1 |
| Comparative Example 7 | PSS | — | — | — | — | — | — | — | — | 1/3 | Good | 4.3 | 1.1 |
| Comparative Example 8 | PSS | — | — | — | — | — | — | — | — | 1/4 | Good | 3.2 | 0.6 |

As is clear from Table 2, when the polyvinyl sulfonic acid of the present embodiment was used as a dopant for conductive polymers, the obtained conducting layer was found to be excellent in terms of conductivity.

Example 33

A heated PVS, a water dispersion containing a composite of poly(3,4-ethylenedioxythiophene) and polyvinyl sulfonic acid, and a conducting layer were obtained by performing the same operations as those in Example 1, with the exceptions that the PVS aqueous solution obtained in Production Example 5 was used, and that the heating time was set at 5 hours, after completion of the production of a PVS solid. The absorbance of the heated PVS was 0.533 at 255 nm, 0.264 at 525 nm, and 0.023 at 800 nm. The molar amount of sulfonic acid groups was 96.2 mol %. This dispersion was stable, and no precipitate was generated therein. The electric conductivity of a conducting layer obtained from this dispersion was 35 S/cm.

Example 34

A heated PVS, a water dispersion containing a composite of poly(3,4-ethylenedioxythiophene) and polyvinyl sulfonic acid, and a conducting layer were obtained by performing the same operations as those in Example 1, with the exception that the PVS aqueous solution obtained in Production Example 6 was used. The absorbance of the heated PVS was 1.210 at 255 nm, 0.612 at 525 nm, and 0.209 at 800 nm. The molar amount of sulfonic acid groups was 89.5 mol %. This dispersion was stable, and no precipitate was generated therein. The electric conductivity of a conducting layer obtained from this dispersion was 32 S/cm.

Example 35

The PVS aqueous solution obtained in Production Example 2 was subjected to vacuum drying by heating at 50° C. for 72 hours to obtain a PVS solid. Thereafter, 20 g of this PVS solid was added into a 300-mL beaker, and it was then subjected to a heat treatment at 110° C. for 10 hours using a fan dryer. The absorbances of the heated PVS at 255, 525 and 800 nm were 0.988, 0.332 and 0.165, respectively. The molar amount of sulfonic acid groups was 86.5 mol %. 15 g of the heated PVS was added into a 2000-mL glass flask equipped with a stirrer and a thermometer, and was then dissolved in 967 g of ion exchange water. Thereafter, 5 g of EDOT and 12.57 g of sodium persulfate (manufactured by Sigma Aldrich) were added to the solution, and the obtained mixture was then blended by stirring at 20° C. for 24 hours to carry out oxidative polymerization. Subsequently, 100 g of cation exchange resin and 100 g of anion exchange resin were added to the reaction mixture, and they were mixed by stirring for 20 hours. Thereafter, the reaction mixture was subjected to filtration and desalination, so as to obtain a water dispersion containing a composite of poly(3,4-ethylenedioxythiophene) and polyvinyl sulfonic acid.

This water dispersion was diluted with ion exchange water to prepare a dispersion containing 0.7 weight % solid (dispersion A).

This dispersion A was stable, and no precipitate was generated therein. The electric conductivity of a conducting layer obtained from the dispersion A was 16 S/cm. The weight ratio of components other than a conductive polymer component to the conductive polymer component, which was calculated from the added ratio of the components, was 3.0.

Example 36

0.08 g of a mixed solution of 2.05 g of tetraethoxysilane (manufactured by Tokyo Chemical Industry Co., Ltd.; hereinafter also referred to as "TEOS") and 2.31 g of ethanol (manufactured by Sigma Aldrich) (wherein the mixed solution contained 47 weight % TEOS; hereinafter also referred to as "TEOS ethanol preparation solution") was weighed into a 20-mL glass vessel, and 15 g of the dispersion A obtained in Example 35 was then added thereto. They were mixed by stirring at a room temperature for 20 hours to obtain a dispersion. This dispersion was stable, and no precipitate was generated therein. The electric conductivity of a conducting layer obtained from this dispersion was 12 S/cm. The weight ratio of components other than a conductive polymer component to the conductive polymer component, which was calculated from the added ratio of the components, was 4.4.

Example 37

A dispersion was obtained by performing the same operations as those in Example 36, with the exception that the mixed amount of the TEOS ethanol preparation solution was set at 0.12 g. This dispersion was stable, and no precipitate was generated therein. The electric conductivity of a conducting layer obtained from this dispersion was 13 S/cm. The weight ratio of components other than a conductive polymer component to the conductive polymer component, which was calculated from the added ratio of the components, was 5.1.

Example 38

A dispersion was obtained by performing the same operations as those in Example 36, with the exception that the mixed amount of the TEOS ethanol preparation solution was set at 0.22 g. This dispersion was stable, and no precipitate was generated therein. The electric conductivity of a conducting layer obtained from this dispersion was 11 S/cm. The weight ratio of components other than a conductive polymer component to the conductive polymer component, which was calculated from the added ratio of the components, was 6.9.

Example 39

A dispersion was obtained by performing the same operations as those in Example 36, with the exception that the mixed amount of the TEOS ethanol preparation solution was set at 0.34 g. This dispersion was stable, and no precipitate was generated therein. The electric conductivity of a conducting layer obtained from this dispersion was 6 S/cm. The weight ratio of components other than a conductive polymer component to the conductive polymer component, which was calculated from the added ratio of the components, was 9.1.

Example 40

A dispersion was obtained by performing the same operations as those in Example 36, with the exception that the mixed amount of the TEOS ethanol preparation solution was set at 0.46 g. This dispersion was stable, and no precipitate was generated therein. The electric conductivity of a conducting layer obtained from this dispersion was 0.2 S/cm. The weight ratio of components other than a conductive polymer component to the conductive polymer component, which was calculated from the added ratio of the components, was 11.2.

Example 41

A water dispersion containing a composite of poly(3,4-ethylenedioxythiophene) and polyvinyl sulfonic acid was obtained by performing the same operations as those in Example 35.
This water dispersion was diluted with ion exchange water to prepare a dispersion containing 0.86 weight % solid (dispersion B).
This dispersion B was stable, and no precipitate was generated therein. The electric conductivity of a conducting layer obtained from the dispersion B was 13 S/cm. The weight ratio of components other than a conductive polymer component to the conductive polymer component, which was calculated from the added ratio of the components, was 3.0.

Example 42

0.075 g of a mixed solution of 1.0866 g of diisopropylamine (manufactured by Kanto Chemical Industry Co., Ltd.) and 10.4512 g of ion exchange water was weighed into a 20-mL glass vessel, and 10.1441 g of the dispersion B obtained in Example 41 was then added thereto. They were mixed by stirring at a room temperature for 2 hours to obtain a dispersion. This dispersion was stable, and no precipitate was generated therein. The electric conductivity of a conducting layer obtained from this dispersion was 11 S/cm. The weight ratio of components other than a conductive polymer component to the conductive polymer component, which was calculated from the added ratio of the components, was 3.3.

Example 43

0.1657 g of a mixed solution of 1.0091 g of dioctylamine (manufactured by Wako Pure Chemical Industries, Ltd.) and 10.3645 g of ion exchange water was weighed into a 20-mL glass vessel, and 10.010 g of the dispersion B obtained in Example 41 was then added thereto. They were mixed by stirring at a room temperature for 2 hours to obtain a dispersion. This dispersion was stable, and no precipitate was generated therein. The electric conductivity of a conducting layer obtained from this dispersion was 10 S/cm. The weight ratio of components other than a conductive polymer component to the conductive polymer component, which was calculated from the added ratio of the components, was 3.7.

Example 44

0.4971 g of a mixed solution of 1.0091 g of dioctylamine (manufactured by Wako Pure Chemical Industries, Ltd.) and 10.3645 g of ion exchange water was weighed into a 20-mL glass vessel, and 10.0657 g of the dispersion B obtained in Example 41 was then added thereto. They were mixed by stirring at a room temperature for 2 hours to obtain a dispersion. This dispersion was stable, and no precipitate was generated therein. The electric conductivity of a conducting layer obtained from this dispersion was 3 S/cm. The weight ratio of components other than a conductive polymer component to the conductive polymer component, which was calculated from the added ratio of the components, was 5.0.

Example 45

0.0814 g of a mixed solution of 0.5122 g of hexamethylenediamine (manufactured by Kanto Chemical Industry Co., Ltd.) and 5.4889 g of ion exchange water was weighed into a 20-mL glass vessel, and 10.0721 g of the dispersion B obtained in Example 41 was then added thereto. They were mixed by stirring at a room temperature for 2 hours to obtain a dispersion. This dispersion was stable, and no precipitate was generated therein. The electric conductivity of a conducting layer obtained from this dispersion was 13 S/cm. The weight ratio of components other than a conductive polymer component to the conductive polymer component, which was calculated from the added ratio of the components, was 3.4.

Example 46

0.7933 g of a mixed solution of 0.1075 g of butylamine (manufactured by Tokyo Chemical Industry Co., Ltd.) and 9.6078 g of ion exchange water was weighed into a 20-mL glass vessel, and 20.0871 g of the dispersion B obtained in Example 41 was then added thereto. They were mixed by stirring at a room temperature for 2 hours to obtain a dispersion. This dispersion was stable, and no precipitate was generated therein. The electric conductivity of a conducting layer obtained from this dispersion was 12 S/cm. The weight ratio of components other than a conductive polymer component to the conductive polymer component, which was calculated from the added ratio of the components, was 3.2.

Example 47

0.9649 g of a mixed solution of 0.1100 g of amylamine (manufactured by Tokyo Chemical Industry Co., Ltd.) and 9.9165 g of ion exchange water was weighed into a 20-mL glass vessel, and 20.0474 g of the dispersion B obtained in Example 41 was then added thereto. They were mixed by stirring at a room temperature for 2 hours to obtain a dispersion. This dispersion was stable, and no precipitate was generated therein. The electric conductivity of a conducting layer obtained from this dispersion was 13 S/cm. The weight ratio of components other than a conductive polymer component to the conductive polymer component, which was calculated from the added ratio of the components, was 3.2.

Example 48

5.2929 g of a mixed solution of 0.0167 g of heptylamine (manufactured by Tokyo Chemical Industry Co., Ltd.) and 6.2300 g of ion exchange water was weighed into a 20-mL glass vessel, and 20.5180 g of the dispersion B obtained in Example 41 was then added thereto. They were mixed by stirring at a room temperature for 2 hours to obtain a dispersion. This dispersion was stable, and no precipitate was generated therein. The electric conductivity of a conducting layer obtained from this dispersion was 6 S/cm. The weight ratio of components other than a conductive polymer component to the conductive polymer component, which was calculated from the added ratio of the components, was 3.3.

TABLE 3

|  | Additive | Weight ratio of other components to conductive polymer component | Evaluation results of water dispersion Stability of water dispersion | Evaluation results of conducting layer Electric conductivity S/cm |
|---|---|---|---|---|
| Example 35 | None | 3.0 | Good | 16 |
| Example 36 | TEOS | 4.4 | Good | 12 |
| Example 37 | TEOS | 5.1 | Good | 13 |
| Example 38 | TEOS | 6.9 | Good | 11 |
| Example 39 | TEOS | 9.1 | Good | 6 |
| Example 40 | TEOS | 11.2 | Good | 0.2 |
| Example 41 | None | 3.0 | Good | 13 |
| Example 42 | Diisopropyl-amine | 3.3 | Good | 11 |
| Example 43 | Dioctyl-amine | 3.7 | Good | 10 |
| Example 44 | Dioctyl-amine | 5.0 | Good | 3 |
| Example 45 | Hexa-methylene-diamine | 3.4 | Good | 13 |
| Example 46 | Butylamine | 3.2 | Good | 12 |
| Example 47 | Amylamine | 3.2 | Good | 13 |
| Example 48 | Heptylamine | 3.3 | Good | 6 |

The present application is based on Japanese patent application (Japanese Patent Application No. 2011-101850), filed on Apr. 28, 2011; the content of which is herein incorporated by reference.

INDUSTRIAL APPLICABILITY

The polyvinyl sulfonic acid of the present invention can be preferably used as a high-molecular-weight dopant for forming a dispersion having high dispersion stability. In addition, a dispersion containing a composite of the polyvinyl sulfonic acid of the present invention and a conductive polymer has high dispersion stability, and thus, it is capable of forming a conducting layer exhibiting high conductivity, without using a high-boiling-point organic solvent. Such a conducting layer can be used for intended use of various optoelectronic components. For instance, the present conducting layer can be used for intended use that particularly requires high conductivity, such as a condenser, a conductive film or a conductive sheet. Specifically, the present conducting layer can be used for intended use such as a polymer light-emitting diode, an organic solar power, a secondary battery, a conductive polymer sensor, a thin film transistor device, an electroluminescence device, or an electrolytic condenser. Also, it can be used as an alternative to an ITO thin film.

The invention claimed is:

1. A polyvinyl sulfonic acid comprising a vinyl sulfonic acid unit represented by the following general formula (1):

wherein $R^1$, $R^2$ and $R^3$ each independently represent hydrogen, or an alkyl group or alkylene group, which has 1 to 15 carbon atoms; and Z represents hydrogen, halogen, an alkyl group or alkylene group, which has 1 to 15 carbon atoms, a metal ion, an ammonium ion, a protonated primary, secondary or tertiary amine, or a quaternary ammonium ion, wherein the polyvinyl sulfonic acid has an absorbance of 0.1 or greater (aqueous solution: 0.2 mass %, cell length: 10 mm) in a wavelength range of 255 to 800 nm wherein the polyvinyl sulfonic acid is prepared by the steps of:

(a) polymerizing a vinyl sulfonic acid monomer represented by the following general formula (1)':

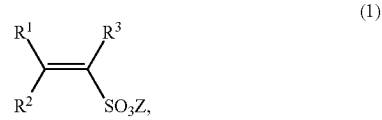

wherein $R^1$, $R^2$ and $R^3$ each independently represent hydrogen, or an alkyl group or alkylene group, which has 1 to 15 carbon atoms; and Z represents hydrogen, halogen, an alkyl group or alkylene group, which has 1 to 15 carbon atoms, a metal ion, an ammonium ion, a protonated primary, secondary or tertiary amine, or a quaternary ammonium ion to obtain a polyvinyl sulfonic acid; and (b) heating the polyvinyl sulfonic acid obtained in step (a) at a temperature from 90° C. to 120° C. for 0.5 to 500 hours.

2. The polyvinyl sulfonic acid according to claim 1, which has a weight average molecular weight of 10,000 to 800,000.

3. The polyvinyl sulfonic acid according to claim 1 or 2, wherein a content of a component having a molecular weight of 5,000 or less is 10% or less.

4. The polyvinyl sulfonic acid according to claim 1 or 2, which has an absorbance of 0.1 or greater (aqueous solution: 0.2 mass %, cell length: 10 mm) in a wavelength range of 475 to 575 nm.

5. A method of producing the polyvinyl sulfonic acid according to claim 1, which comprises the steps of:
polymerizing a vinyl sulfonic acid monomer represented by the following general formula (1)':

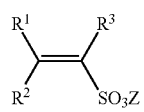

wherein $R^1$, $R^2$ and $R^3$ each independently represent hydrogen, or an alkyl group or alkylene group, which has 1 to 15 carbon atoms; and Z represents hydrogen, halogen, an alkyl group or alkylene group, which has 1 to 15 carbon atoms, a metal ion, an ammonium ion, a protonated primary, secondary or tertiary amine, or a quaternary ammonium ion to obtain a polyvinyl sulfonic acid; and
heating the polyvinyl sulfonic acid at a temperature from 90° C. to 120° C. for 0.5 to 500 hours.

6. The method for producing the polyvinyl sulfonic acid according to claim 5, wherein, in the heating step, the polyvinyl sulfonic acid is in a state of a mixture with a solvent.

7. A composite comprising: the polyvinyl sulfonic acid according to claim 1; and a conductive polymer.

8. A dispersion formed by dispersing the composite according to claim 7 in a solvent.

9. A method for producing the dispersion according to claim 8, which comprises the steps of: dissolving and/or dispersing the polyvinyl sulfonic acid according to claim 1 in a solvent; and polymerizing a conductive polymer monomer in the solvent in which the polyvinyl sulfonic acid has been dissolved and/or dispersed.

10. The method for producing the dispersion according to claim 9, which further comprises the steps of:
removing the polymerized product obtained in the polymerization step in a state of a solid, and then washing the solid; and
dissolving and/or dispersing the solid after the washing step in a solvent.

11. A conducting layer produced using the dispersion according to claim 8.

12. A condenser comprising the conducting layer according to claim 11.

13. A conductive film or a conductive sheet comprising the conducting layer according to claim 11.

14. The conducting layer according to claim 11 comprising poly(3,4-ethylenedioxythiophene), wherein,
in a reflection method XDR measurement, a peak area ratio between a peak K in which 2θ is 8° to 10° and a peak L in which 2θ is 24° to 28° (peak K area/peak L area) is 1.0 to 10.0.

15. A dispersion that forms the conducting layer according to claim 11, wherein
the conducting layer comprises poly(3,4-ethylenedioxythiophene), and
in a reflection method XDR measurement of the conducting layer, a peak area ratio between a peak K in which 2θ is 8° to 10° and a peak L in which 2θ is 24° to 28° (peak K area/peak L area) is 1.0 to 10.0.

16. The dispersion according to claim 15, which comprises a conductive polymer and a polyanion.

17. The dispersion according to claim 16, wherein the conductive polymer is poly(3,4-ethylenedioxythiophene).

18. The dispersion according to claim 16, wherein the polyanion is the polyvinyl sulfonic acid according to claim 1 or 2.

19. A conducting layer formed from the dispersion according to claim 15 or 16.

20. A method for producing the dispersion according to claim 15, which comprises the steps of: dissolving and/or dispersing a polyanion in a solvent; and polymerizing a conductive polymer monomer in the solvent in which the polyanion has been dissolved and/or dispersed.

21. The method for producing the dispersion according to claim 20, which further comprises the steps of:
removing the polymerized product obtained in the polymerization step in a state of a solid, and then washing the solid; and
dissolving and/or dispersing the solid after the washing step in a solvent.

22. A condenser comprising the conducting layer according to claim 14.

23. A conductive film or a conductive sheet comprising the conducting layer according to claim 14.

* * * * *